US012603087B2

(12) United States Patent
Alessi et al.

(10) Patent No.: US 12,603,087 B2
(45) Date of Patent: Apr. 14, 2026

(54) VOICE RECOGNITION USING ACCELEROMETERS FOR SENSING BONE CONDUCTION

(71) Applicant: STMICROELECTRONICS S.R.L., Agrate Brianza (IT)

(72) Inventors: Enrico Rosario Alessi, Catania (IT); Fabio Passaniti, Syracuse (IT); Nunziata Ivana Guarneri, Caltanissetta (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 382 days.

(21) Appl. No.: 17/881,473

(22) Filed: Aug. 4, 2022

(65) Prior Publication Data

US 2023/0045064 A1    Feb. 9, 2023

Related U.S. Application Data

(60) Provisional application No. 63/230,597, filed on Aug. 6, 2021.

(51) Int. Cl.
*G10L 15/22* (2006.01)
*H04R 1/46* (2006.01)

(52) U.S. Cl.
CPC .............. *G10L 15/22* (2013.01); *H04R 1/46* (2013.01); *H04R 2460/13* (2013.01)

(58) Field of Classification Search
None
See application file for complete search history.

(56) References Cited

U.S. PATENT DOCUMENTS 4,994,983 A * 2/1991 Landell ................. G10L 15/063
704/245
9,196,261 B2 11/2015 Burnett et al.
(Continued)

FOREIGN PATENT DOCUMENTS

CN        207251863 U  *  4/2018
CN      109 346 075 A      2/2019
(Continued)

OTHER PUBLICATIONS

STMicroelectronics, "LSM6DSOX: Machine Learning Core," *Application Note AN5259, Rev 4*, www.ST.com, Aug. 2020, 67 pages.
(Continued)

*Primary Examiner* — Hai Phan
*Assistant Examiner* — Jon Christopher Meis
(74) *Attorney, Agent, or Firm* — Seed Intellectual Property Law Group LLP

(57) ABSTRACT

Voice command recognition and natural language recognition are carried out using an accelerometer that senses signals from the vibrations of one or more bones of a user and receives no audio input. Since word recognition is made possible using solely the signal from the accelerometer from a person's bone conduction as they speak, an acoustic microphone is not needed and thus not used to collect data for word recognition. According to one embodiment, a housing contains an accelerometer and a processor, both within the same housing. The accelerometer is preferably a MEMS accelerometer which is capable of sensing the vibrations that are present in the bone of a user as the user is speaking words. A machine learning algorithm is applied to the collected data to correctly recognize words spoken by a person with significant difficulties in creating audible language.

16 Claims, 23 Drawing Sheets

(56) References Cited

U.S. PATENT DOCUMENTS

| | | | | |
|---|---|---|---|---|
| 9,313,572 | B2 | 4/2016 | Dusan et al. | |
| 9,516,442 | B1 | 12/2016 | Dusan et al. | |
| 2004/0204880 | A1* | 10/2004 | Cheriet | H04B 17/309 |
| | | | | 702/77 |
| 2012/0000287 | A1* | 1/2012 | Frangi | G01P 15/125 |
| | | | | 73/514.32 |
| 2014/0072148 | A1* | 3/2014 | Smith | H04R 1/1083 |
| | | | | 381/151 |
| 2015/0154981 | A1 | 6/2015 | Barreda et al. | |
| 2015/0245129 | A1* | 8/2015 | Dusan | G10L 21/0208 |
| | | | | 381/71.6 |
| 2015/0356981 | A1 | 12/2015 | Johnson et al. | |
| 2017/0092297 | A1 | 3/2017 | Sainath et al. | |
| 2018/0324518 | A1* | 11/2018 | Dusan | G06F 3/167 |
| 2018/0367882 | A1 | 12/2018 | Watts et al. | |
| 2020/0074998 | A1 | 3/2020 | Sawata et al. | |
| 2020/0128317 | A1* | 4/2020 | Feldman | H04R 1/083 |
| 2020/0135230 | A1 | 4/2020 | Tong et al. | |
| 2020/0380955 | A1* | 12/2020 | Lesso | G06F 1/163 |
| 2022/0078561 | A1* | 3/2022 | Lai | G10L 21/02 |
| 2022/0106186 | A1* | 4/2022 | Qin | B81C 1/0023 |
| 2022/0174394 | A1* | 6/2022 | Haartsen | H04R 3/005 |
| 2022/0270593 | A1 | 8/2022 | Rivolta et al. | |
| 2023/0370788 | A1* | 11/2023 | Shu | H04R 25/305 |

FOREIGN PATENT DOCUMENTS

| | | | | | |
|---|---|---|---|---|---|
| CN | 109729471 | A | * | 5/2019 | |
| EP | 1503368 | A1 | | 2/2005 | |
| JP | 2018074551 | A | * | 5/2018 | |
| JP | 2021018272 | A | * | 2/2021 | |
| WO | WO-2011150394 | A1 | * | 12/2011 | H04R 1/46 |
| WO | 2022236803 | A1 | | 11/2022 | |

OTHER PUBLICATIONS

Heracleous et al., "Exploiting alternative acoustic sensors for improved noise robustness in speech communication," *Pattern Recognition Letters* 112:191-197, 2018.

Hershey et al., "Model-Based Fusion of Bone and Air Sensors for Speech Enhancement and Robust Speech Recognition," ITRW on Statistical and Perceptual Audio Processing ICC Jeju,Korea, Oct. 3, 2004. (6 pages).

Jorgensen et al., "Speech interfaces based upon surface electromyography," *Speech Communication* 52:354-366, 2010.

* cited by examiner $3 \ Bg + 3 \ Bs + m(3Bg) + m(3Bs) + aeiou + m(aeiou) + L + R + D + U + RL + ROT + aRL + aRL$

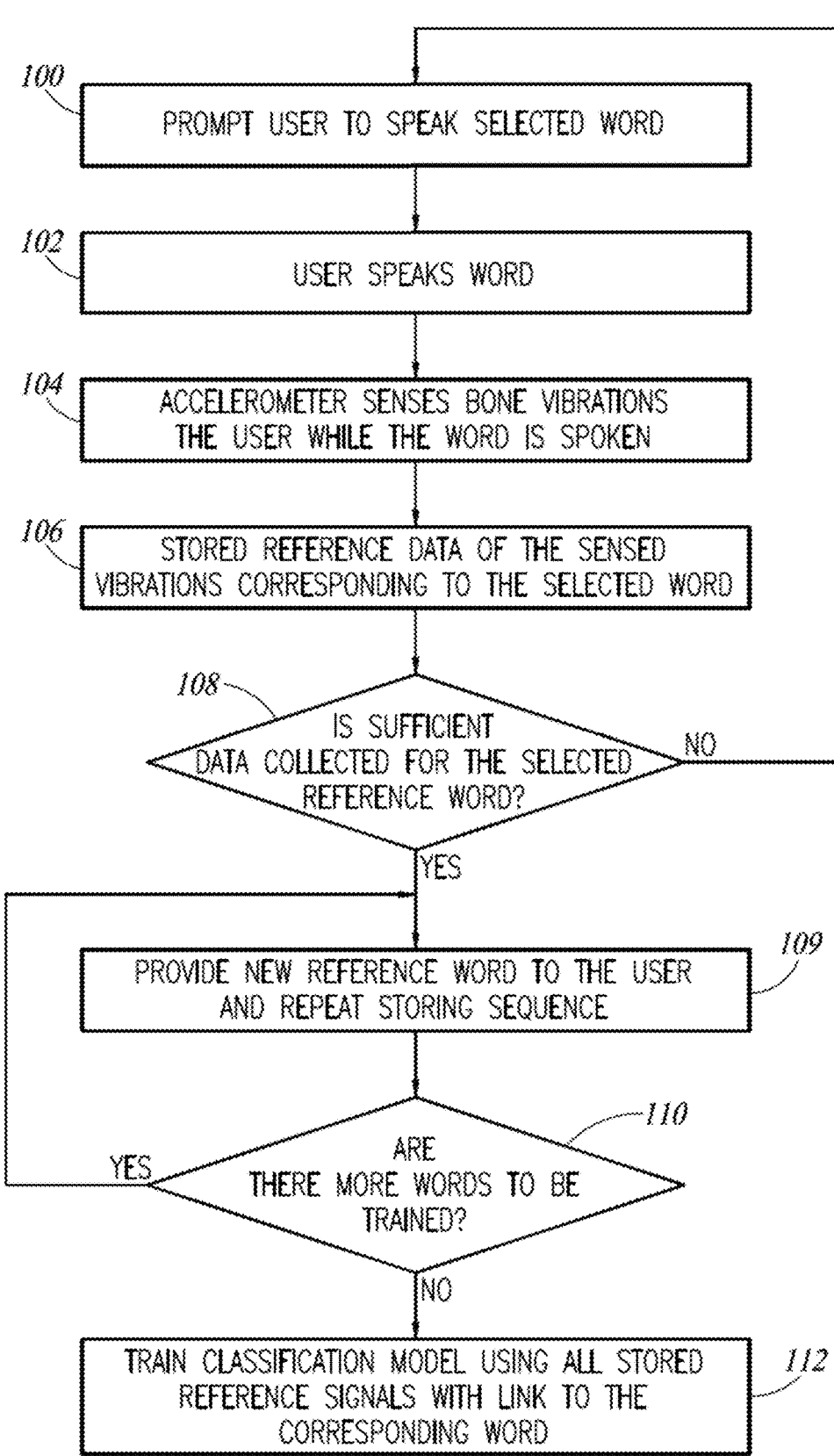

*100* — PROMPT USER TO SPEAK SELECTED WORD

*102* — USER SPEAKS WORD

*104* — ACCELEROMETER SENSES BONE VIBRATIONS THE USER WHILE THE WORD IS SPOKEN

*106* — STORED REFERENCE DATA OF THE SENSED VIBRATIONS CORRESPONDING TO THE SELECTED WORD

*108* — IS SUFFICIENT DATA COLLECTED FOR THE SELECTED REFERENCE WORD?     NO

YES

*109* — PROVIDE NEW REFERENCE WORD TO THE USER AND REPEAT STORING SEQUENCE

*110* — ARE THERE MORE WORDS TO BE TRAINED?     YES     NO

*112* — TRAIN CLASSIFICATION MODEL USING ALL STORED REFERENCE SIGNALS WITH LINK TO THE CORRESPONDING WORD

FIG. 13

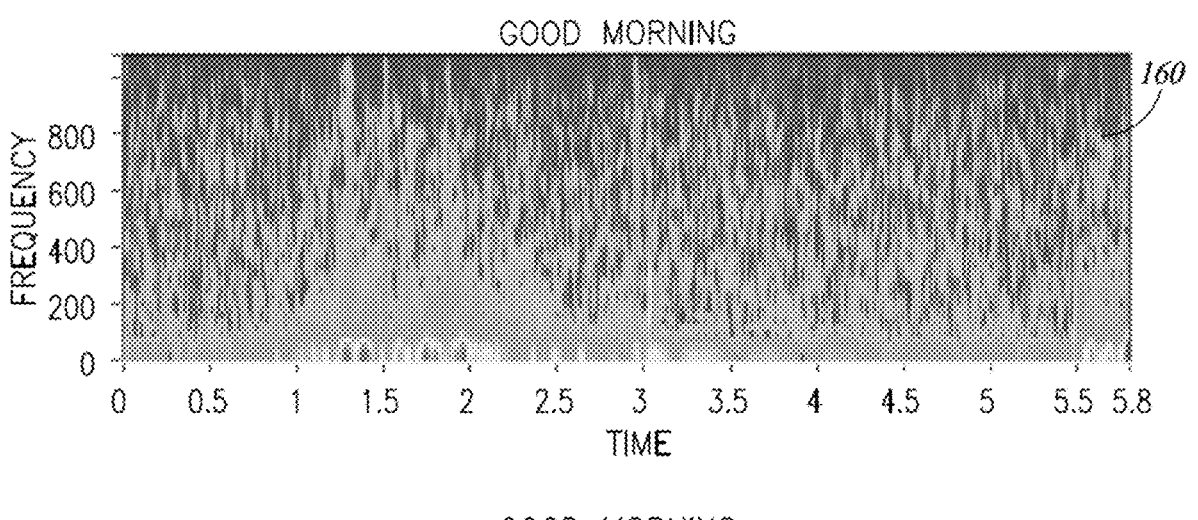
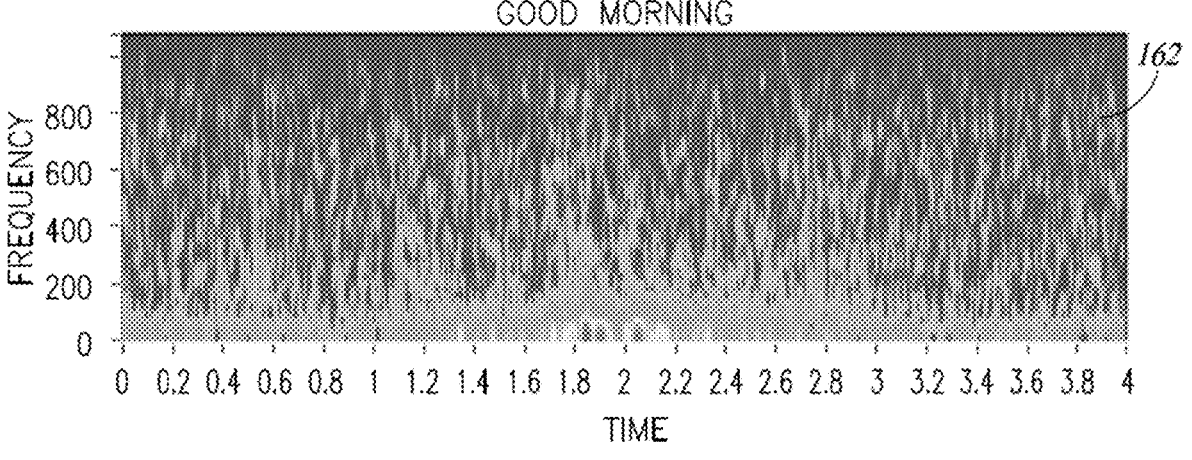
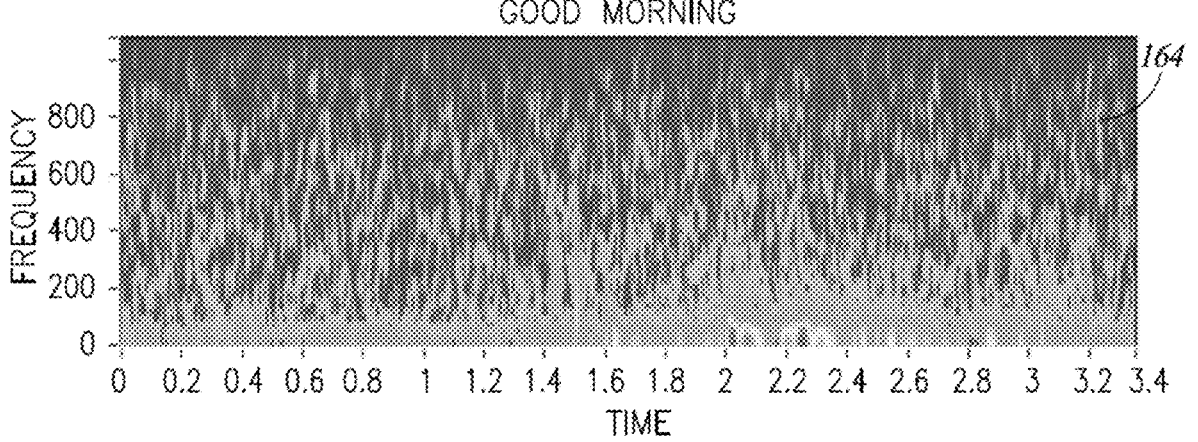
FIG. 16B

VOICE RECOGNITION USING ACCELEROMETERS FOR SENSING BONE CONDUCTION

BACKGROUND

Technical Field

This present disclosure is in the field of natural language voice recognition, and more particularly, in the field of using accelerometers configured to receive vibrations of a bone of a user to recognize words spoken by the user.

Description of the Related Art

Various methods and systems are currently in use for recognizing words spoken by a user. The majority of the devices available today make use of an acoustic microphone that picks up words spoken by a user using an audio airflow detector. The acoustic microphone is used to detect acoustic frequency signals that correspond to user speech that come from the user's voice box as spoken into the open air. In addition, there are some devices in the prior art that make use of detecting a user's speech vibrations using one or more microphones in combination with accelerometers that are positioned in ear buds of a user, in which the ear buds are wired or wireless speaker and microphone devices positioned in the ear of the user. However, these accelerometers that are used in combination with an acoustic microphone are used as a voice activity detector and not to recognize or identify the word that has been spoken. Each of these devices of the prior art have a number of shortcomings with respect to effectively recognizing words being spoken by a user in which the user is not capable of clear pronunciation of a word for recognition by an acoustic microphone. In situations in which a user has a physical disability that renders them not capable of clear verbal speech an acoustic signal to be picked up by a microphone is not sufficient to perform word or even voice recognition.

BRIEF SUMMARY

According to the present disclosure, voice command recognition and natural language recognition are carried out using an accelerometer that senses signals from the vibrations of one or more bones of a user. Since word recognition is made possible using solely the signal from the accelerometer, an acoustic microphone is not needed and thus not used to collect data for word recognition. Bone conduction is the conduction of sound to the inner ear through the bones of the skull.

According to one embodiment, a housing contains an accelerometer and a processor, both within the same housing. The accelerometer is preferably a MEMS accelerometer which is capable of sensing the vibrations that are present in the bone of a user that is speaking words. A processor is positioned within the same housing as the MEMS accelerometer and is electronically coupled to the accelerometer. The processor is configured to process the sensed vibrations received in the signal from the accelerometer and to output a signal indicative of the identity of a word spoken by the user.

In one embodiment, the housing is positioned to wrap around the neck of a user and contains at one location of the housing a MEMS accelerometer and also a processor to receive signals from the MEMS accelerometer. When the housing is positioned on the neck of the user adjacent to the larynx, also called the voice box, the vibrations from the hyoid bone are sensed. According to another embodiment, the housing is positioned adjacent to a user's chin bone to sense vibrations conducted from the user's chin bone while in another embodiment, the accelerometer is positioned adjacent to a user's palatine bone, to sense vibrations of the user's palate.

A method of training and recognizing words spoken by a user include creating and sensing a reference set of audio vibrations that correspond to a known word that has been spoken. The user speaks the known word, vibrations from a bone of a user are sensed using an accelerometer. A reference signal or sample signal corresponding to the spoken word is output from the accelerometer to a processor based on the sensed reference vibrations. The reference signal is stored to train the function and identify a match a spoken word in an inference step or in use, after training the function. The input is received from another source that provides the identity of a word that is known to match the reference signal. For example, a user can be prompted by a display to speak a known word while the reference data is collected. Alternatively, the known word can some from a keyboard input, a mouse input, or other selection from a computer that identifies the spoken word that result in the generation of the reference signal. The reference signal is then stored as a match to the word which has been provided. This process is repeated a number of times to obtain additional reference signals for the same word in order to train a classification model which may be a neural network. It is also repeated a number of times for different words so that a large number of reference words are trained. A classification model is trained to classify different signals into the different words using the references used for training the function.

At a later point in time, a sample set of audio vibrations are sensed that are conducted from the bone of the user using an accelerometer. A sample signal is output from the accelerometer based on the sample sensed vibrations. The classification model receives the sample signal and outputs a label value. A threshold determination is carried out to determine whether or not the label value is within a threshold value of a stored word. If the label value is within the threshold value of a reference word, then the sample signal is determined to be a match to the store word. Once a match has been determined, the stored word is output as the word which has been spoken corresponding to the sample set of audio vibrations sensed by the accelerator.

An individual user with or without speech or pronunciation challenges can interact with this natural language recognition system in a training phase or step. In high acoustic noise environments, accelerometric audio can be advantageous where microphones are impacted by the noise and traditional speech recognition routines fail. The system may have a training step program that prompts the user to speak a set of selected words, such as by displaying the word on a monitor of a computer or laptop or on a handheld electronic device, such as a cell phone or a tablet. The system may display a first word, such as ball, and prompt the user to say the word one or multiple times, such as at a cadence prompted on the display. A detection device that is on the user, such as adjacent to the user's neck, resting partially on the scalene or trapezius muscles and the back of the user's neck. The detection device is an impaired speech aid. The detection device may be an implanted unit in the user's head or may be separate from the user, but positioned close to a user's head.

When the user pronounces or speaks the prompted word, the detection device will collect vibrational information that is indicative of the prompted word as pronounced by this user. The system may collect one sample or a series of samples of each word during the training step or a pre-training step. Each sample is transmitted as a signal coming from accelerometer and corresponding to the bone vibration due to the pronunciation of a word. This sample signal is transmitted as input to a function, algorithm, or neural model stored on the computer or on a remote server. The output of this function is a set of n (such as n=11) labels, where each label may represent a word. This function is a neural model that has been generated by collecting a group of words pronounced by the user. The function is developed in the training step after collecting some signals from the user. The training step to build out the function may happen asynchronously from the collection of the samples. Once the function is built for the specific user, the function can be stored in a device or accessed in real-time by the user to benefit from the model, i.e., the user can utilize the detection device to help the user communicate more effectively with others. The use of the model may be referred to as an inference step.

The neural model, which is a function, may be represented by a matrix of weights. The generation of the model uses or learns from a collection of words to be recognized or a collection of signals coming from accelerometer and representing the vibration when a word is pronounced. So, for example, the neural model may be created by working with 11 words, where 3-4 signals are collected for each word, i.e., the system collects and stores the accelerometer signal for 3-4 different repetitions of the same word. The system can create spectrograms and more features from the 3-4 different repetitions of the same word to generate 100 or more generated samples.

A dataset of 1100 signals is created (100 generated sample signals×11 word=1100 signals). This dataset can be used to train the neural model. At the end of this training process, a neural model is created. The neural model can be thought as a function that receives an input signal outputs one of the 11 labels. Once the model is created, the model will remain the same and will be used to receive speech and provide an interpretation of the speech. To work with a new model, for example, able to recognize a higher number of labels, it is necessary to re-train the neural network by using an augmented dataset containing new words. The collection of data and the training of a Neural Network is an "off-line" or asynchronous process. The recognition of a word when the system is in use, comes from running the signal through the function or neural model to identify the word.

This technique is particularly useful for users who are unable to clearly speak words. Various users may have a physical disabilities that do not permit the user to clearly output sound waves into the air. According to this disclosure the words spoken can still be properly recognized based on vibrations sensed in the neck, ear, palate, jaw, or skull of the user. In addition, some users may have various speech impediments, such as neck injuries, biological defects to the voice box, the palate, mouth, teeth or other disabilities which prevent the clear speaking of words that could be recognized by an acoustic microphone. The present technique of using an accelerometer that senses vibrations from the bone of a user permits clear recognition of words spoken by the user even though an acoustic sound corresponding to that word could not be recognized. Furthermore, this technique is useful in situations where high level of environmental noise is present and sound reception by microphone through air is degraded. This system can be utilized in areas where there is high level of environmental noise collected by microphone, such that the user voice can be collected though only bone vibration.

BRIEF DESCRIPTION OF THE SEVERAL VIEWS OF THE DRAWINGS

FIG. 13 illustrates one method by which data are collected to train a classification model

FIG. 16B is data collected based on bone conduction of the same phrase from three different individuals who have significant language difficulties.

DETAILED DESCRIPTION

Figure 1:
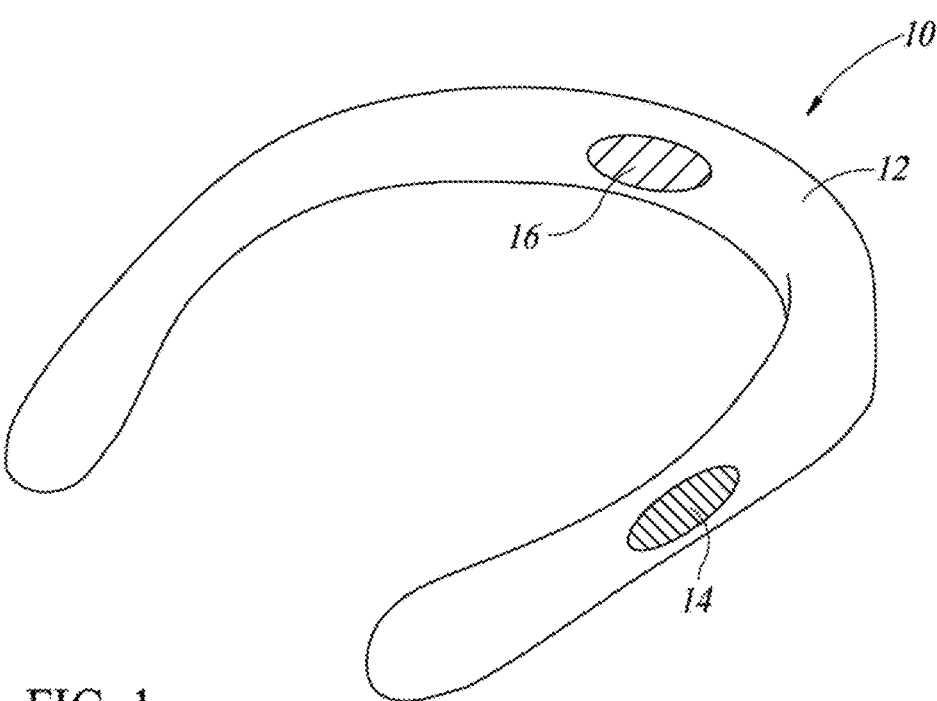
FIG. 1 is a perspective view of a housing to be positioned around the neck of a user for word recognition based on the conduction of bones in the neck as sensed by an accelerometer.

FIG. 1 shows a system 10 for recognizing speech using an accelerometer or accelerometers that sense vibrations from the user's body based on bone conduction and other vibrations within the user's body as opposed to recognizing speech with a microphone. According to one embodiment of the system 10, it includes a housing 12 for positioning around the neck of a user. The housing 12 includes an accelerometer 14 and a microprocessor 16 electrically coupled to the accelerometer.

The system 10 is configured to collect and process accelerometric audio signals from high acoustic noise environments regardless of the speech capabilities of the user. Accelerometric audio is immune to acoustic noise environment. In these high noise environments, microphone speech recognition may fail and the accelerometer vibration detection can still accurately and effectively recognize speech of the user. In some embodiments, no microphone will be included in the housing 12.

The housing 12 has a curved shape in a central portion from which a first arm and a second arm extend. The first and second arms curve toward a front of the user's neck and are configured to position the accelerometer 14 adjacent to and within a distance to detect bone vibrations in the user's hyoid, jaw, or others bones of the skull. The accelerometer 14 is positioned on the first arm. A second accelerometer may be positioned in the second arm in an alternative embodiment. The housing 12 will include a power supply such as a battery that is coupled to the processor and the accelerometer. The housing may include a wireless charging device or may include a port to be coupled to a power source to charge the battery. The housing may include a wireless transceiver that transmits collected signals from the accelerometer or may transmit the data when coupled to separate computer or tablet.

The housing 12 may be made of a flexible material, such as silicone that is comfortable on the user's skin. The housing 12 may include an internal, flexible skeleton that can be bent into a position and maintain that positon to allow the user to comfortable and effectively position the first and second arm for speech detection.

In an alternative embodiment, a pair of ear buds capable of true wireless stereo will including at least one accelerometer in the pair. For example, a left ear bud may include a speaker, a microphone, an accelerometer, a processor, and a battery. The processor is configured to transmit and receive signals, such as the sound signals to be played by the speaker, any audio signals collected by the microphone, and vibration or accelerometric signals collected by the accelerometer. A right ear bud may include a speaker, a microphone, a processor, and a battery.

In a different configuration both the left and right ear bud will each include a speaker, a microphone, an accelerometer, a processor, and a battery. In yet another alternative the left and right ear buds may omit a microphone.

Figure 2:
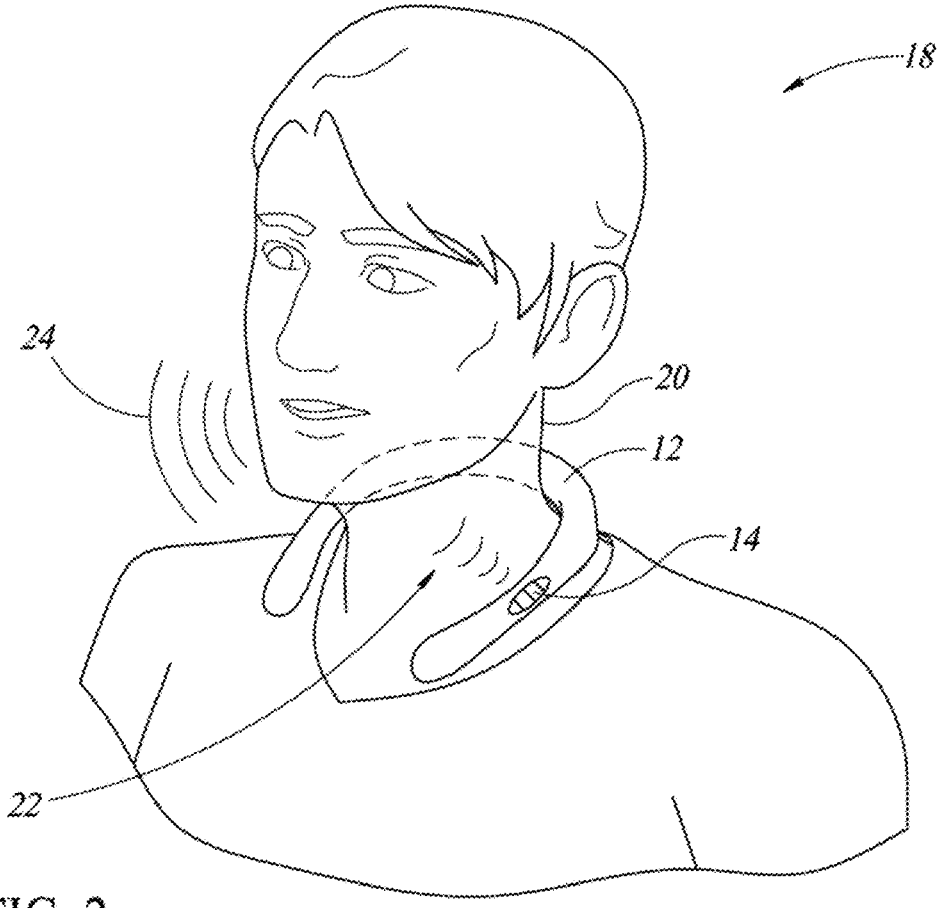
FIG. 2 is an illustration of the user wearing the neck housing of FIG. 1.

FIG. 2 illustrates operation of a preferred embodiment of the housing 12 for positioning around the neck of a user. In particular, a user 18 has the housing 12 positioned around their neck 20. The housing 12 includes an accelerometer 14 which is positioned to receive vibrations 22 that originate in the neck 20 of the user 18. The vibrations 22 include bone conduction vibrations, movement of the throat vibrations, and other accelerations that occur as the user speaks. When the user is speaking words acoustic vibrations 24 of the words spoken are created. However, the acoustic vibrations 24 are not sensed or picked up by the system 10. Instead, the system 10 has no input to receive acoustic vibrations based on the spoken word or movement of air as the user speaks. The sole input for recognizing the speech is an accelerometer which is adjacent to or coupled to the user's body.

As shown in FIG. 2, as the user speaks, vibrations 22 originating in the neck 20 of the user are picked up by the accelerometer 14 and signals corresponding to the vibrations are sent to the processor. The vibrations will be based at least in part on bone conduction of the vibration as the user is speaking particular words. For a housing coupled to the neck, this might be a neck bone or the hyoid bone. As the words are spoken, the signals are sent from the accelerometer 14 corresponding to the vibrations and received by the processor 16. The processor 16 performs an analysis of the vibrations and recognizes the words which have been spoken as explained elsewhere herein in more detail.

Figure 3:
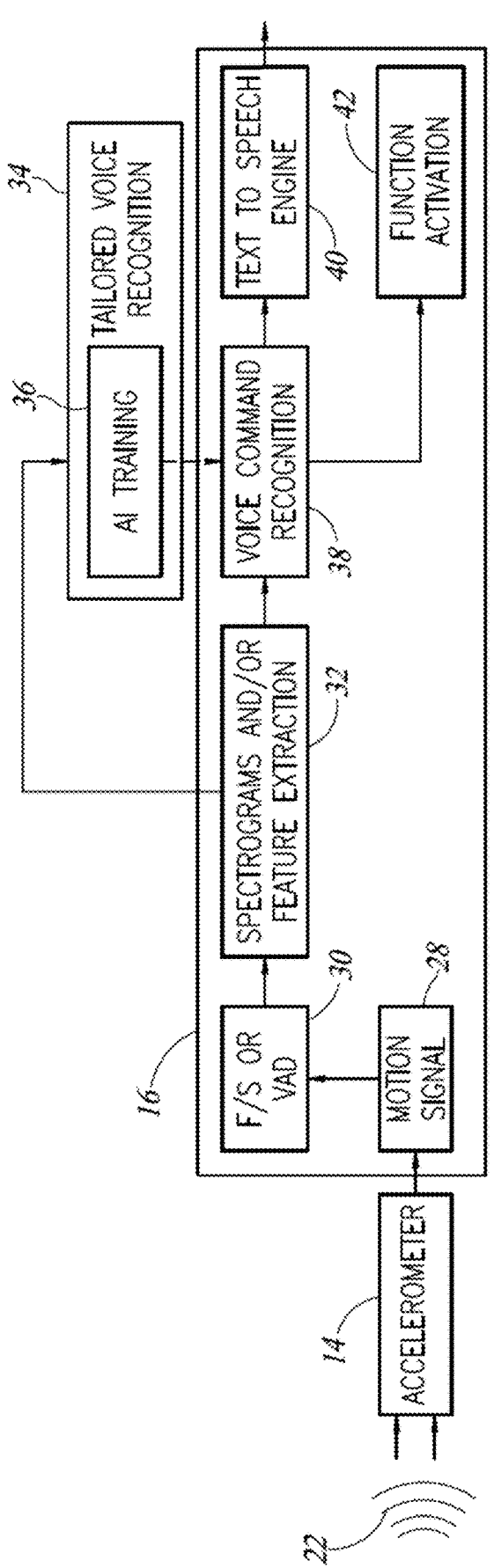
FIG. 3 is a block diagram of sensing the conduction of acoustic signals from the bones of a user and recognizing a word that is spoken.

FIG. 3 illustrates a block diagram of a system for carrying out the spoken word recognition according to principles of the present disclosure. As illustrated in FIG. 3, the accelerometer 14 receives vibrations 22 based on bone conduction and body movement, such as a positon of the user's head as they speak words. The vibrations are sensed by the accelerometer in the x, y, and z axis. The accelerometer 14 receives the signals and transmits these as motion signals to the processor 16. The processor 16 contains a motion signal reception circuit or module 28 that receives the motion signals from the accelerometer 14. After the motion signals are received in the motion signal reception module 28, they are output to a filter and segmentation circuit 30 which may also include a voice activation detection circuit. According to one embodiment, the filter and segmentation and/or voice activity detection circuit 30 detects that words are being spoken and activates the recognition algorithm according to the present disclosure. Alternatively, the block 30 is not necessary and is not used in some embodiments. Instead, the output from the motion signal reception module 28 is input directly to a spectrogram and feature extraction module 32. The spectrogram and feature extraction module 32 within the processor 16 performs the creation of a spectrogram from the motions and also extracts various features from the motion signal which has been sensed. The created spectrogram and feature extractions are input to a tailored voice recognition circuit 34 which performs the voice recognition according to principles disclosed elsewhere herein. The tailored voice recognition circuit module 34 can be within the processor 16 in one embodiment, while in other embodiments, it may be in a separate processor, for example, on a desktop, a laptop, or a separate processor in the cloud which performs the tailored voice recognition training and function. In one embodiment, the tailored voice recognition module 34 may process the spectrograms and feature extraction in a batch in a later time instead of in response to each vibration 22.

Within the tailored voice recognition module 34 is artificial intelligence training module 36. The artificial intelligence training module 36 performs machine learning to train a classification model for recognizing the various motions and classify them as one of the selected word which has been spoken by the particular user as described elsewhere herein. The artificial intelligence training takes place as explained in FIG. 13 so that the words spoken by the user can be particularly recognized.

In one embodiment, the user begins a training program that will prompt the user to say a word or series of words (phrases) a number of times. The training program will collect the accelerometer output associated with each prompted word or series of words and store this in a memory in the housing, such as in the processor or a stand-alone memory. The memory may store the spectrograms and extracted features from the extraction module 32. This extraction module 32 may be stored in the processor. Once a set of test or training data has been collected, the neural model is trained to create a function that is configured to classify a received voice patterns of the user and to identify a label for the prompted words or phrases. Once the function is created, the function can be stored in the housing for real-time speech recognition without a connection to a wireless network, like a cellular network or Wi-Fi. This function is represented by the voice command recognition module 38.

The training is performed in the training module 36 that may be housed in a remote system that receives the training data wirelessly or through a wired connection. The neural model generates the function to create tailored voice recognition for each individual user. The system may be configured to train for a set number of specific words and phrases, for a voice command purpose. Alternatively, the system may be configured to train for natural language speech recognition. The different being the time and quantity of words and phrases to collect and train the neural model with.

After the training of recognizing a particular sequence of words is carried out in the tailored voice recognition circuit module 34, the classification model or function is stored in a memory within the processor 16, or in another remote file which may be associated with a personal computer or the cloud and then is saved for future use in the voice recognition. For an embodiment with a specific, limited set of words or phrases, such as for voice commands, the function will have n labels trained before being loaded or programmed into the processor 16. The labels can include instructions associated with the label, once identified by the function, that will trigger an action (such as in block 42) by the processor or a separate internet of things enabled device. For example, the user could say "lock the front door" and the label associated with this phrase will activate a separate program that is coupled to a wireless locking system installed at the user's front door.

At a later point in time, after the classification model has been created, a user as shown in FIG. 2 speaks a word and the vibrations 22 from the spoken word are picked up by the accelerometer 14 and input to the motion signal circuit 28. For the motion signal circuit 28, they are input to the spectrogram and feature extraction module 32. During the voice recognition operation of the circuit, the spectrograms and feature extraction signals are sent directly to the voice command recognition module 38 which has previously received and stored therein the classification model provided from the voice recognition circuit 34. After the word spoken is recognized, then additional action can be taken, for example, the recognized words can be sent to a text-to-speech module 40 which will convert the spoken word to text and also convert the spoken word to a speech and output the spoken word from a speaker so that the word spoken can be clearly heard. Alternatively, or in addition, the recognized word can be sent to a function activation circuit 42 to activate certain functions, for example, to turn on a light, open a door, turn on a computer, move a wheelchair, or take other action.

The context in which the particular voice recognition device of the present disclosure can be used will now be described in more detail for a greater understanding of the benefits provided therein.

Frequently, people have a number of factors that affect their ability to speak clear words. A person may have a disability, a disease, or other condition which makes it difficult or impossible for them to clearly speak words that can be heard through the normal acoustic process. For example, the person may have had a stroke, may become old and unable to speak loudly through their mouth, and may have had dental work, an injury accident to their mouth, their throat, their neck, their palate or some other part of their body.

When a person has a vocal speech limitation condition, they are still able to move their neck, body, palate, or other body part to speak words, however, the words are not clearly heard using the standard acoustic process. For example, the user may be attempting to say "good morning," but instead the only sounds that might be made would be heard acoustically as a short grunt, such as "grr," or "grrrrn." Thus, while the user has made an attempt to say the words "good morning," in fact the acoustic words spoken and heard acoustically by those adjacent to the user will not hear a recognized word at all. However, the user will desire to communicate words to the audience surrounding them so that they can engage in normal social interaction or carry out certain commands. The system of the present disclosure makes that possible.

Figures 4A, 4B, 4C, 4D:
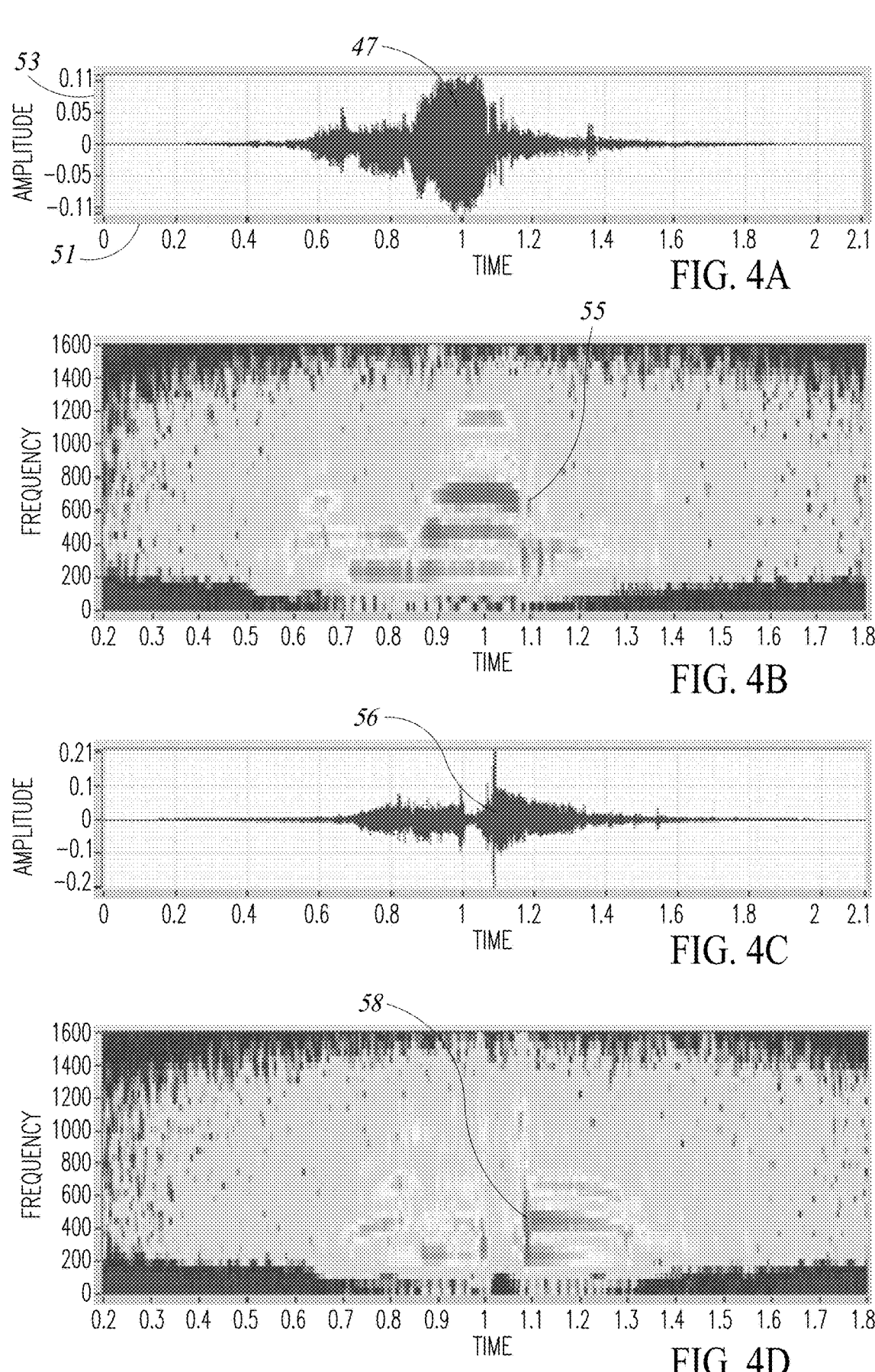
FIG. 4A represents an xy acceleration signal of a first spoken word as sensed by an accelerometer.
FIG. 4B is a spectrogram of the acceleration sensed in FIG. 4A.
FIG. 4C is an xy acceleration signal based on conduction of the bones for a different word spoken by a user.
FIG. 4D is a spectrogram of the signal of FIG. 4C.

FIG. 4A shows a signal 47 whose amplitude 53 is shown as sum of x and y acceleration signals as sensed by an accelerometer over time on the horizontal axis 51 while a first word is spoken.

FIG. 4B is a spectrogram 55 of the acceleration sensed in FIG. 4A. As is known, a spectrogram is in the frequency domain as sensed over time.

FIG. 4C shows a signal 56 whose amplitude is shown as the sum of x and y acceleration signals as sensed by an accelerometer over time on the horizontal axis while a second, different word is spoken.

FIG. 4D is a spectrogram 58 of the acceleration sensed in FIG. 4C.

Figure 5:
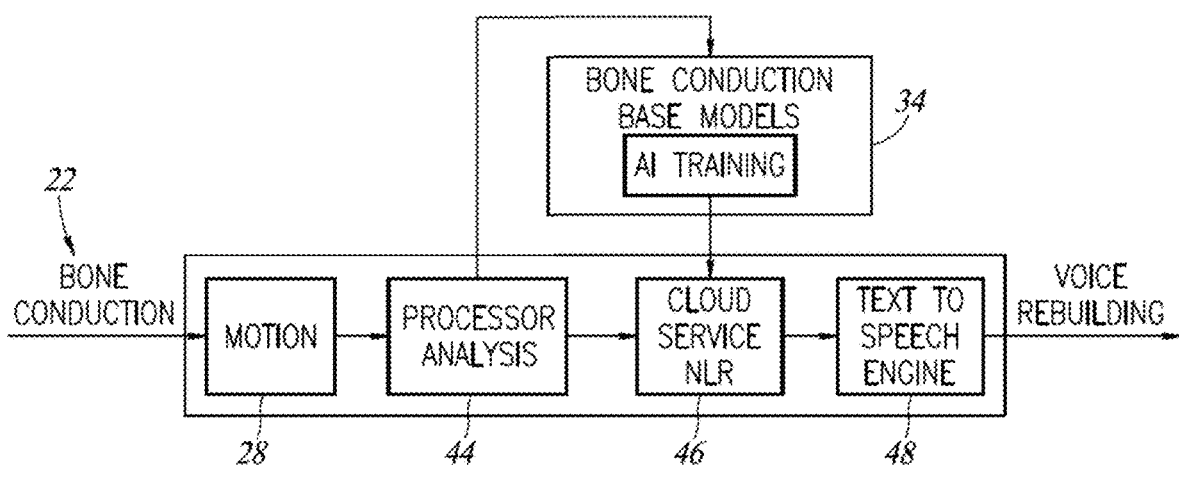
FIG. 5 is a block diagram of a system for recognizing words spoken according to principles of the present disclosure.

FIG. 5 is a block diagram of one alternative embodiment for carrying out the speaking to recognition of the word spoken, followed by output of speech. According to the embodiment of FIG. 5, bone conduction takes place as the user speaks the words. As the words are spoken, motion is sensed in the accelerometer 14 in the motion signal sensor circuit 22. The signal from the accelerometer 14 is then sent to the processor for processor analysis to take place in step 44. If the appropriate training is not complete, then during the initial training schedule, the signals will be sent to the training module 34 in which training takes place based on the particular location of the accelerometer or sensor and the words spoken as described elsewhere herein. Since the accelerometers can be positioned at different locations with respect to the user's body, some training may take place for each individual accelerometer 14, which will create a custom dataset based on the location of that accelerometer with respect to the user. The classification model is created in the training module 34 and then is made available for use by other processors. In the embodiment of FIG. 5, a cloud service 46 performs natural language processing in order to do natural language recognition of the words which have been spoken. In the particular embodiment of FIG. 5, the function may be stored in the cloud and the processing for identifying the particular word that has been spoken occurs using cloud resources. This is compared to the embodiment of FIG. 3 in which all of the resources are contained within the same housing 10. In particular, in the embodiment of FIG. 3, the processor, including all training software and all databases or memory locations are stored within the same housing 10 and the processor 16 is adjacent to the accelerometer 14. For the embodiment of FIG. 5, the training module 34, as well as the recognition module 46 are carried out in remote processors, such as on a distance on a remote server, in a cloud service, or other remote location accessible via an internet connection. After the spoken word has been recognized, the identity of the word is output from module 46 to a text-to-speech engine 48. The text-to-speech engine 48 can be in the cloud, or alternatively, it can be at a local processor in the same housing with the user device 10, as explained in FIG. 3. Preferably, in the embodiment of FIG. 5, the text-to-speech analysis is carried out remotely, such as in the cloud remote server, and then the signal to create the spoken voice is sent back to the local user via the appropriate connection, whether internet, wireless, or other acceptable technique. In the embodiment of FIG. 5, the local housing 10 has little to no local processing resources. In the embodiment of FIG. 5, all of the local resources can be carried on in a single semiconductor chip, which includes both the accelerometer and whatever processing is necessary to analyze the signal and send it to a remote location in which additional processors, not present in the housing 10, carry out the analysis and word recognition. Thus, in one embodiment, the processor module 44 is in a remote server and the processor 16 for carrying out the recognition is not in the same housing as the accelerometer 14.

Figure 6:
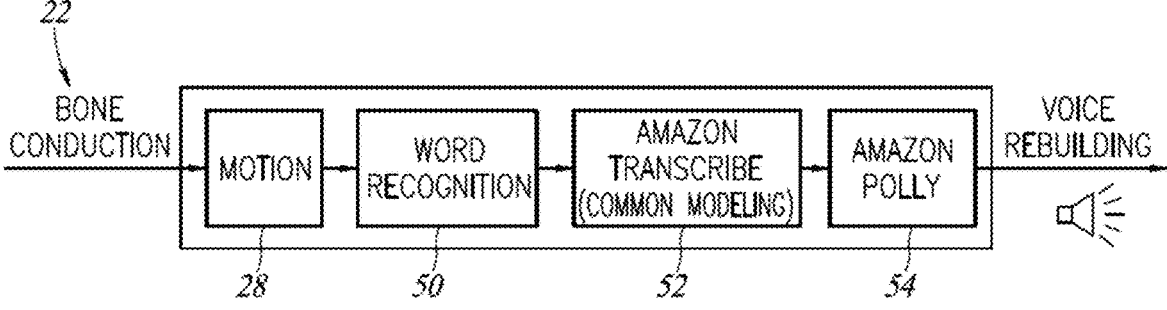
FIG. 6 is an further embodiment for recognizing the words spoken based on bone conduction.

FIG. 6 illustrates an embodiment in which significant cloud resources are used in order to convert the spoken phrase by the user to a word that is output by a local speaker adjacent to the user. In the embodiment of FIG. 6, as the user speaks, a bone conduction vibration 22 is created that is sensed by the accelerometer 14 and a motion signal is created in module 28. The motion signal created in module 28 is then output to a word recognition module 50 which may be at any acceptable location. The module 50 may be local to the user and in the same housing 10 as the device coupled to the user, or, it may be at a remote location and carried out using processing power not present with the user. In the embodiment of FIG. 6, the word recognition module 50 contains stored therein the classification model as well as the linking to the words which have been spoken that are identified with that particular user and therefore the full word recognition takes place within the module 50. After the word is recognized, the identity of the word is output to a commercially available transcription service, in this embodiment, an Amazon transcription service 52. The Amazon transcription service performs the appropriate processing, which may include natural language processing, in order to recognize the identity, context, sentence structure, and meaning of the phrases which have been spoken. The spoken phrase is then output to a text-to-speech engine 54, in the example shown, the commercially available text-to-speech module 54 sold by Amazon and the Amazon Polly. Amazon Polly 54 will create the voice, and then will output the voice which has been spoken to the appropriate speaker so that those listening can hear what the person has said.

The embodiments of FIGS. 5 and 6 are particularly useful if the user is speaking to a person who is remote. Such conversations may occur on an internet conference call, a phone call, or other conversation that could occur over a remote communication link. These embodiments permit a person who is not capable of recognizable speech to have worthwhile conversations via cell phone, internet connection, or other available link with other people at distant locations. Thus, a person who has had a throat injury, a stroke, or some other condition that prevents them from speaking words correctly as an acoustic signal can, using the system and devices disclosed herein, train the system to recognize as spoken words through particular motions made as they attempt to speak a word that has been identified to them. The system will recognize the motion 22 from the user, match it to the desired word, and then create the spoken word which can be output to any location, such as during a cell phone conversation.

While according to a preferred embodiment, the motion being picked up by the accelerometer 14 as an attempt of the user to speak a particular word, it is not necessary that the vibrations 22 originate at the vocal chords, or as the user attempts to say, as closely as they can, the presented word. For example, a word can be presented to the user to train the system and the accelerometer 14 can sense attempts to speak the word based on vibrations from the neck or larynx, even if the vocal chords do not operate properly or some or all of them are missing. Thus, the accelerometer can be positioned to sense a motion of the user's body and using the training module 34, match that particular motion to a selected word and store that to be used in training so that it is recognized any time the user carries out that particular motion, even if the voice box is not fully functional.

Figure 7:
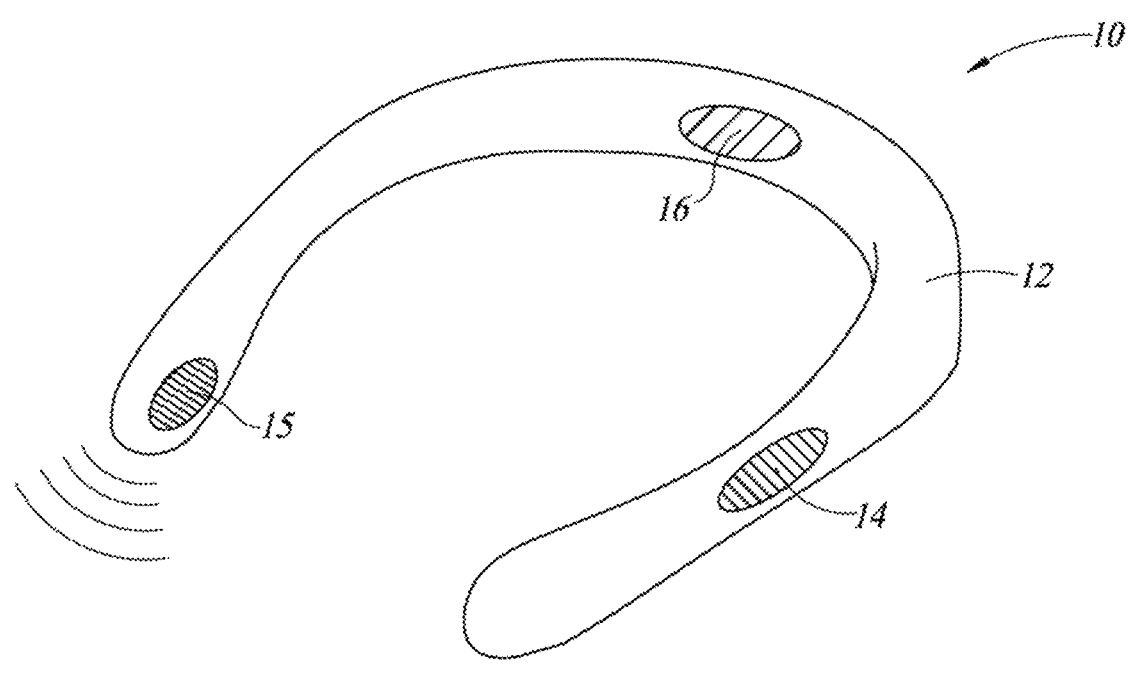
FIG. 7 is an isometric view of a housing for positioning around the neck, further including a speaker.

FIG. 7 illustrates one embodiment of the recognition to speech system 10 enclosed in a single housing. In the embodiment of FIG. 7, a housing 12 is configured to be positioned adjacent to the neck of the user. In this embodiment, the housing 12 contains all of the modules, processors, speakers, and hardware necessary to convert the spoken word by the user to an acoustic output that local people can hear. In this embodiment, the accelerometer 14 is adjacent to the person's neck and is contained within the housing 12 together with the processor 16 and the speaker 15. Then, as described herein with respect to other figures, for example, FIG. 3, the user speaks a word, it is recognized as a motion signal in the accelerometer 14, and sent to the processor 16 where the identity of the word is matched as a label and then sent to the speaker 15 so that the word can be output as an acoustic signal for those in the presence of the user to hear. Thus, in this way, the person wearing the housing 12 can talk in a normal voice, at a normal speed, and as they speak, the spoken words are output from the speaker 15 as if they were coming from the speaker's mouth. After a large number of words have been trained, in some instances a few dozen words, while in other instances several hundred words, the user 18 will be able to carry out somewhat normal conversations with those people in his or her presence. As they speak a normal sentence, the motion signals 22 are sent by the accelerometer 14, the identity of the words spoken is determined by the processor 16, and then speech output via the speaker 15.

Figure 8:
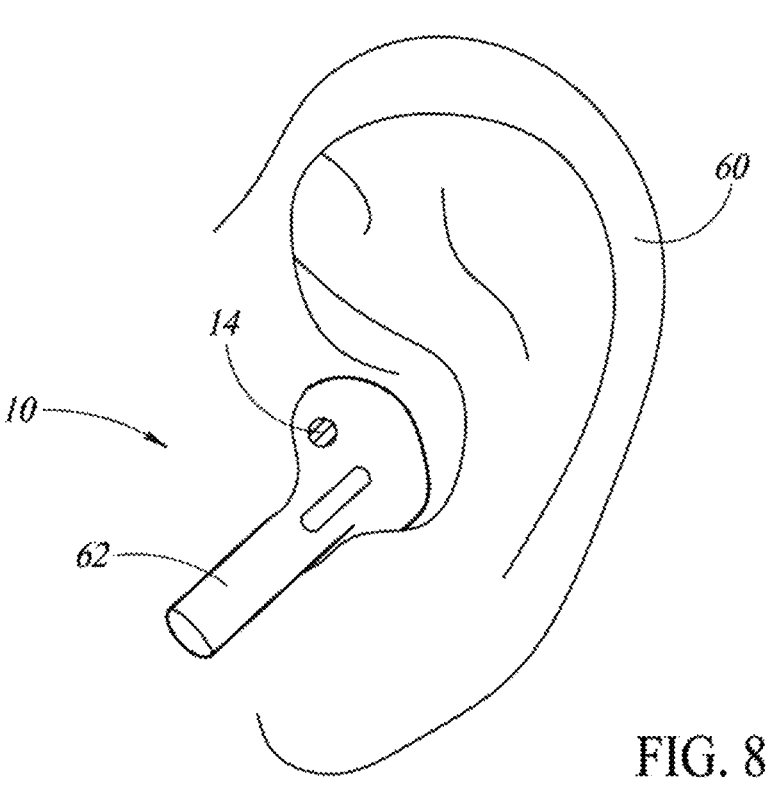
FIG. 8 is a housing containing an accelerometer for positioning in the ear of a user.

FIG. 8 illustrates an embodiment in which the system 10 is fully contained within the housing 62 of an earpiece that is positioned in an ear 60 of the user. In this particular embodiment, the accelerometer 14 is positioned adjacent to the bones in the person's ear. As the person speaks, the vibrations of the bones in the ear create a motion pattern 22 corresponding to the words which have been spoken. The accelerometer 14 in the person's ear senses the vibrations in the ear bones and outputs a signal corresponding to the vibration it sensed. The system then converts the sensed vibrations to a recognized word and provides the identity of that word. The steps set forth in FIG. 3, 5, or 6 can be carried out in the embodiment of FIG. 8 as previously described. As will be appreciated, the motion 22 taking place in the ear bones of a user will significantly different than the motion which occurs at the neck of the user for the same spoken word. Accordingly, the training module 34 will perform training that is specific to the accelerometer 14 being positioned at the person's ear. The system will have stored therein an indication that the training took place using an accelerometer 14 that was positioned at the user's ear bone and therefore, when a signal is received, the identity of the location at which the pickup signal is provided together with the data. The data signal identifies the location of the accelerometer while the motion is being sensed, and this is provided to the processor 16. The processor 16 will therefore use the classification model which is specific to that particular location in order to perform the spoken word recognition. As will be appreciated, in the embodiment in which the processor 16 is in the same housing 62 with the earpiece, it will be recognized that the signal originated in the ear bones of the user. For those embodiments in which the recognition is done at a remote location, such as shown in FIGS. 5 and 6, then the motion signal will carry with it data indicating the origin of the motion and the location of the accelerometer at the time that the motion was sensed.

Figure 9:
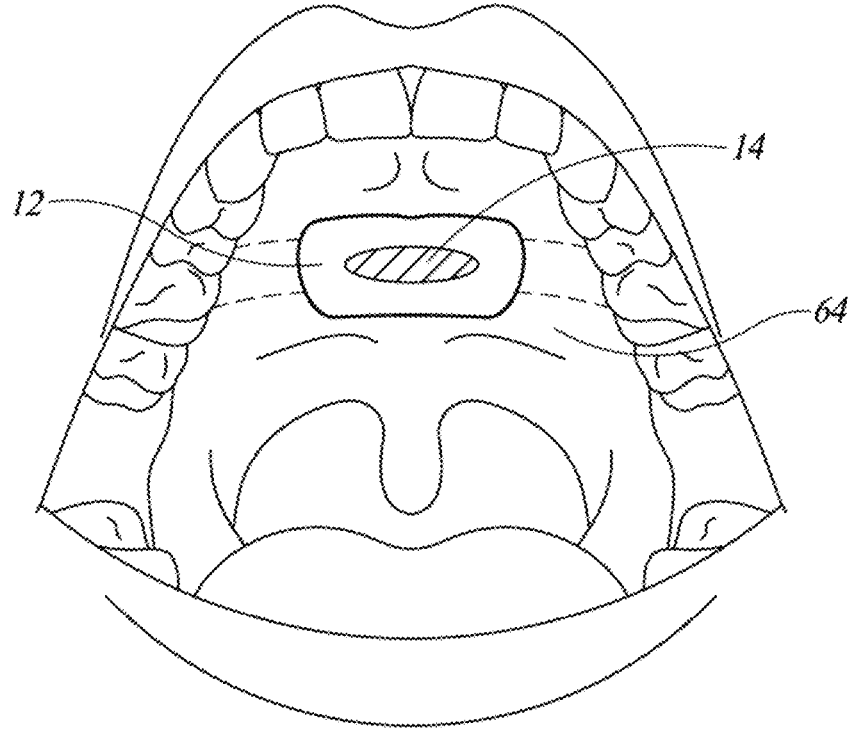
FIG. 9 is a view of a housing for positioning adjacent to the palatine bone of a user, adjacent to the palate.

FIG. 9 shows an embodiment in which the system 10 is installed in the palate of the user. In particular, the housing 12 is shaped and configured in order to be attached to the palatine bone 64. As the user speaks, vibrations from the palatine bone 64 are sent by the accelerometer 14 and the vibrations then are converted to a motion signal in the appropriate motion signal pickup 28 and their output to the processor 16 as described with respect to the prior figures herein. For some users, having the accelerometer 14 adjacent to the palatine bone 64 will be the most efficient in performing the recognition of the word which has been spoken.

Figure 10A:
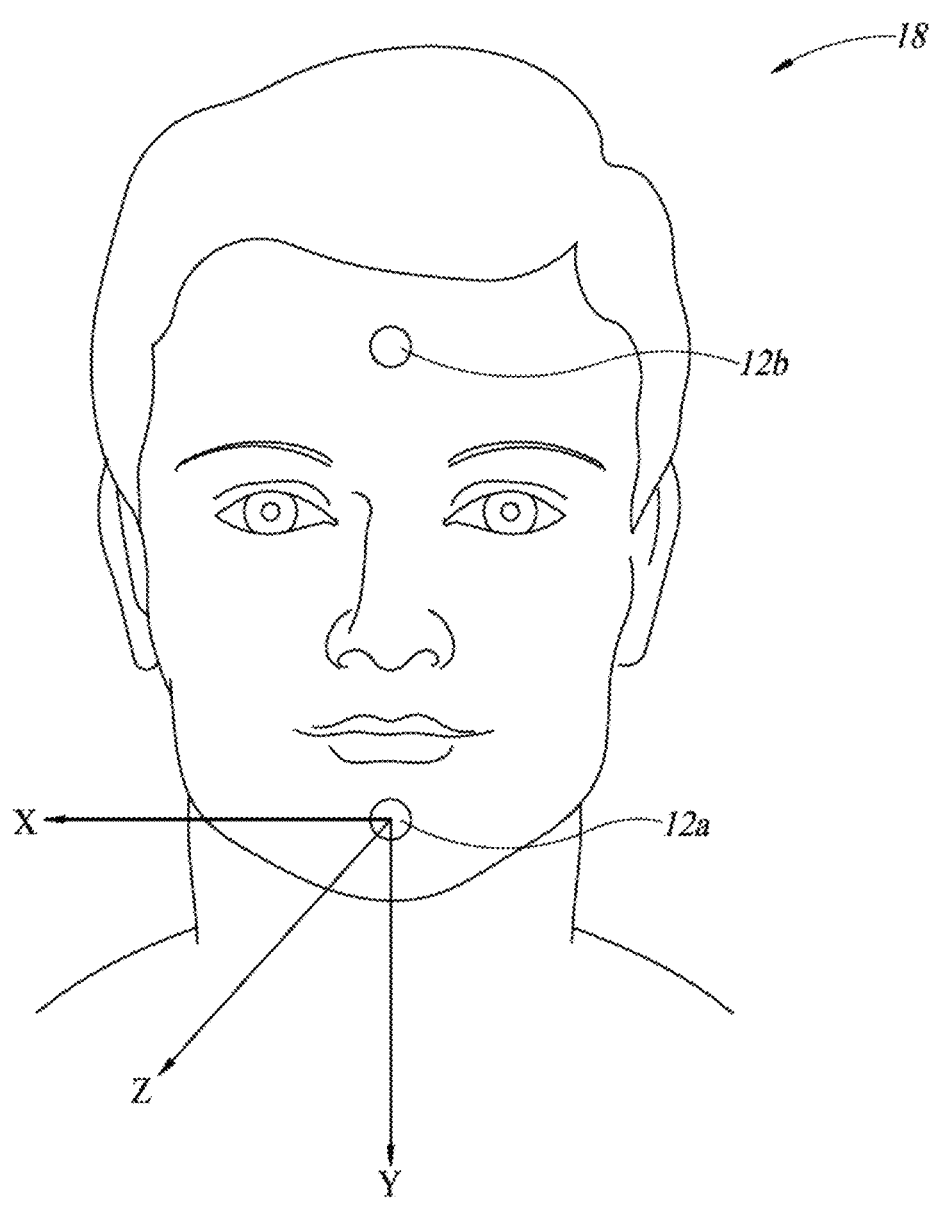
FIGS. 10A and 10B illustrate a user speaking with an accelerometer in housings positioned on the chin and forehead.

FIG. 10A illustrates additional locations in which the housing 12 can be positioned at different locations on the user. In the embodiment of FIG. 10A, two housings 12 are positioned on the user, a first housing 12a on the chin bone and a second housing 12b on the skull bone, in this embodiment, on the forehead. The respective housings 12a and 12b can be at other locations on the user, for example, one can be adjacent the neck, another one at the crown of the head, while another one can be at a different position on the skull, adjacent the ear, on the jaw, or at the front of the chin. The embodiment of FIG. 10A illustrates the different locations in which the housing 12 can be positioned and the multiple housings can be connected to the user's body in order to increase the data which is collected and recognize different types of motion of the user as will now be described with respect to FIG. 10B.

Figure 10B:
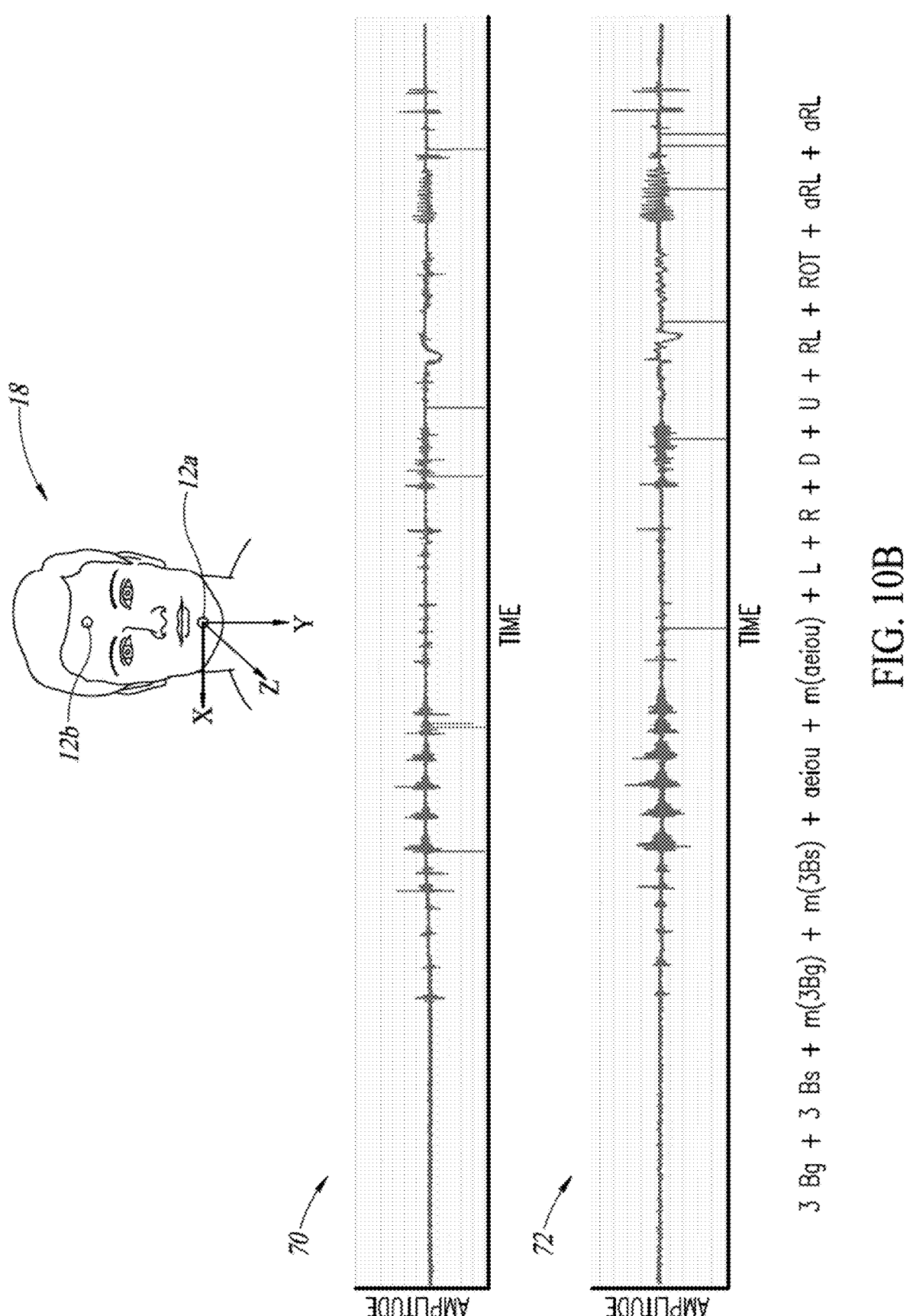

FIG. 10B illustrates speech recognition carried out as a test to how the speech patterns change based on movement of the person's body while they are speaking. In FIG. 10B, the user 18 has a first housing 12a coupled to the chin and a second housing 12b coupled to the forehead. Each of the sensors detect vibrations coming through the bone based on words spoken and they also detect vibrations or movement of the body, for example, moving the arm or the hand, moving the head, or other changes in the position of the user as they speak.

Graph 70 of FIG. 10B shows the motion and vibration detected by the accelerometer 14 positioned on the forehead of the user in housing 12b. Graph 72 shows the motion and vibrations detected by the accelerometer 14 within the housing 12a positioned on the chin of the user. As the user was speaking words, the amplitude of the signal received at the respective accelerometers 14 are shown in the graphs as the signals 70, 72 with the amplitude over time. As illustrated in the text below the graphs in FIG. 10B, the user over time first spoke three buongiorno's, Italian for good morning, and then spoke three buonasera's, Italian for good evening. The three times that the person spoke the words good morning and good evening can be seen in the vibration response of the amplitude as shown in graphs 70 and 72 at the respective sensors 12b and 12a. Next, the speaker said each of the words buongiorno and buonasera three times, but while moving their head in various motions. As can be seen in the graph, while the head was moving, the accelerometers sensed movement of the head and recorded the sensed changes in the head motion simultaneously for sensing the vibrations that occurred while the user was speaking the word. Thus, the next six signals represent the person speaking the words good morning and good evening while simultaneously moving their head as they spoke. After this, the user spoke a number of different letters, for example, the letters A, E, I, O, U, while holding their head stationary, and then while constantly moving their head, and simultaneously spoke the same letters A, E, I, O, U. After this, the user moved their head without speaking, as shown in the symbols below and in the amplitude of the motion sensed by the accelerometer to respective locations. As indicated below, after speaking the words, the user moves their head to the left, then to the right, then down, then up, then quickly right and left, then they rotated their head, and then, for the last two test patterns, they hummed a constant sound with their mouth out loud while rotating and moving the head right to left, and repeated this twice. The humming with their mouth open is represented by the letters aRL, meaning that they were making the "aww" sound as a hum, with their mouth open while turning their head right to left.

The results of this study indicate that the system is able to easily distinguish speech patterns from body motion. In particular, this is preferably carried out using a high pass filter. Compared to vibrations and motion which is sensed from words spoken, the movement of the body is relatively slow and is represented by slower frequency signals. Therefore, a filter which blocks or eliminates low frequency motion is applied to the signal, which is effective to eliminate body motion. It can also effectively eliminate motion of other body parts, such as the arms, or hands, the legs, or limbs of the body. Accordingly, in a preferred embodiment, a signal condition is carried out of the signal that is output by the accelerometer 14 and therefore after the motion sensing signal occurs, a filtering is carried out in order to remove signals that are not within the frequency of the spoken voice. In addition, a filter is also applied to filter out and block higher frequencies, which are well above the human voice range. Thus, frequencies which might be coming from an external source, whether it be lights, the computer, or other frequencies, or, if the user is holding a device in their hand such as a vibrating product, a computer, or other product, whose frequency is much higher than the human voice, this is removed by filtering out the high frequencies.

The test is carried out and FIG. 10B illustrates that it is possible to use the current system with only a single accelerometer. It is not necessary to have accelerometers positioned to sense movement of the human body such as the head or other body members. Instead, according to a preferred embodiment, only a single accelerometer 14 is used and the signal received from the single accelerometer 14 is filtered and conditioned in order to receive all vibration and motion that comes conducted through the bone of a user based on the user attempting to speak a word and to block motion that comes from other sources not associated with the user attempting to speak a word.

Figure 11:
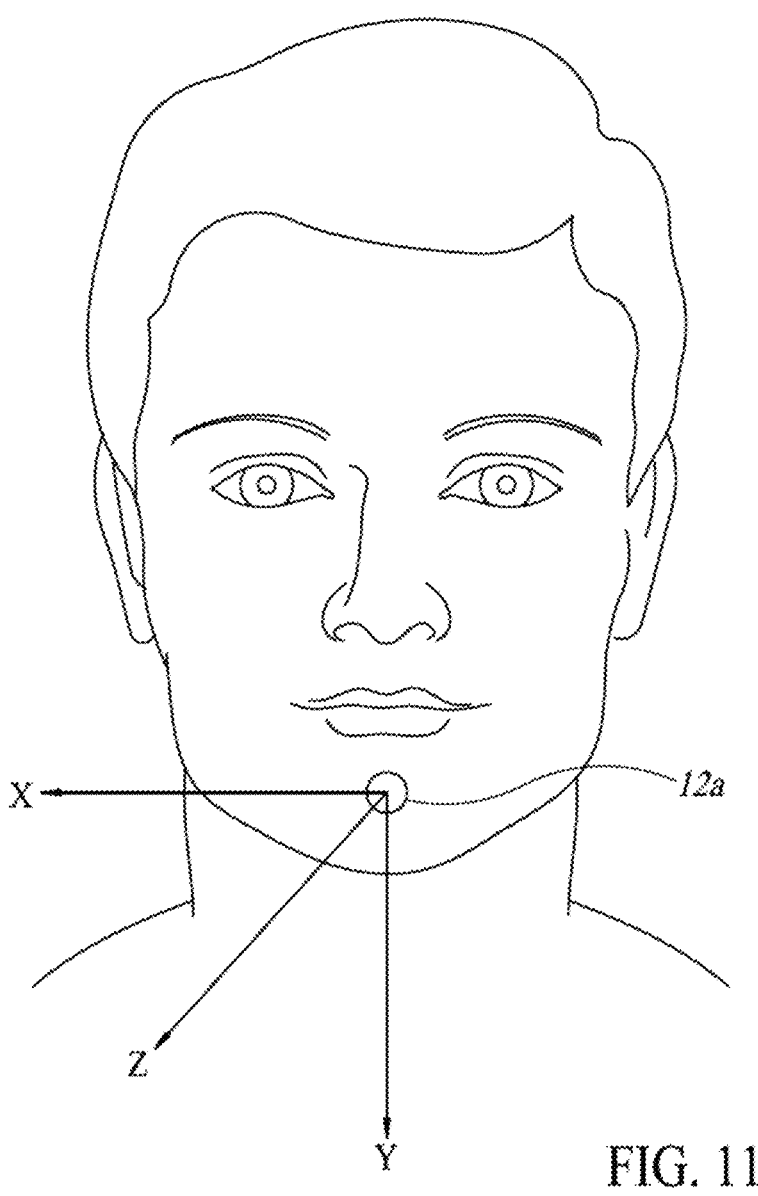
FIG. 11 illustrates a housing positioned solely on the chin of a user.

FIG. 11 illustrates the embodiment in which a single sensor housing 12a is positioned on the chin of a user. In this embodiment, the sensor 12a contains an accelerometer 14 and, in one embodiment, communicates wirelessly to other systems in order to perform the processing and signal creation remotely. In the embodiment of FIG. 11, the housing 12a can be extremely small, perhaps the size of the head of a pin, or perhaps even smaller. In this embodiment, the accelerometer 14 is sufficiently positioned to properly receive and sense motion based on a speech pattern or the user speaking, particularly based on vibrations coming through the chin bone, the jaw, or other locations on the face. The housing 12a contains only a very small MEMS accelerometer 14 and then a transmitter in order to transmit the signals wirelessly to another location which carries out the additional processing as described elsewhere herein.

Thus, the embodiment of FIG. 11 has the advantage of the pickup being incredibly small, and depending on its location, could be essentially hidden and not viewable by another person. For example, a small dot, the size of the head of a pin or smaller could be placed at the back of the jaw bone, adjacent a person's ear bone, or other location on the neck or skull of the user. The user will create a series of samples to train the neural network and generate the function by speaking a number of words as described herein with the housing of the sensor 12a at the desired location, and thereafter can continue their normal day having the housing 12 at the selected location, and then can have another device, such as an iPad, a computer, such as a laptop computer, a radio, or other device that will receive the signal, perform the signal processing in order to match the word with the classification model trained on the collected samples, recognize the word, and then speak the word clearly to those who are in the presence of the user. Thus, the user is now able to carry out a social interaction on a friendly basis with a number of different people in his or her presence and be able to communicate clearly with them even though based on certain physical impairments in their ability to produce vocal acoustic sounds are able to have the words they are speaking recognized, immediately spoken from a speaker which is associated with that person, which they may have in their pocket, carry in their hand, or other speaker that is adjacent to them.

As can be appreciated, the housing 12a is shown enlarged in FIG. 11 and in most embodiment, would be extremely small. The embodiment of FIG. 11 also permits the user to wear the accelerometer 14 as an accessory piece of jewelry. For example, it is very possible that the user may wish to wear a stud in their jawbone, an earring that is positioned through their ear, a stud positioned in their tongue, or some other housing which would be considered jewelry to the user and to those in the presence of the user. The present disclosure provides for such jewelry to include an accelerometer 14 and the necessary transmission antennas to permit the words spoken by the user to be recognized and then output from a speaker that the user carries with them, such as a cell phone, an iPad, or other locally carried portable device.

Figure 12:
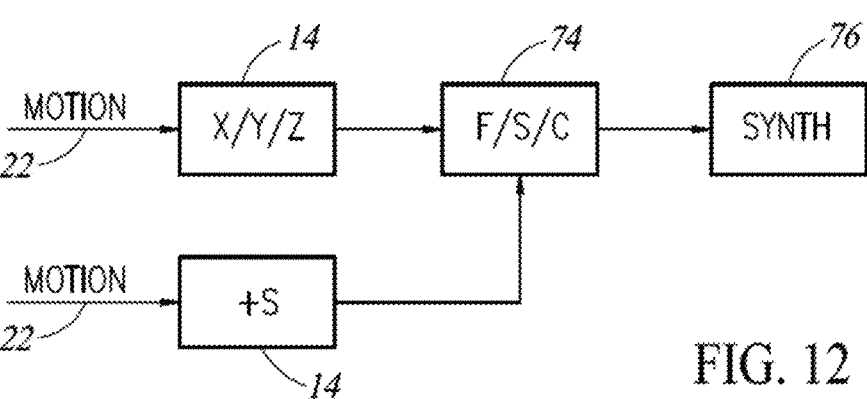
FIG. 12 is a block diagram illustrating one embodiment for voice recognition using multiple motion-to-speech sensors.

FIG. 12 illustrates the process of carrying out the input from the various sensors while speaking using the system of FIGS. 10A, 11, or in some embodiments, FIG. 7. As illustrated in FIG. 12, a plurality of accelerometers 14 may be positioned at different locations on the user's body. As the user speaks a word, motion vibrations 22 are sensed by the respective accelerometers 14. They can be sensed as x, y, and z direction movements, or different sensing movements and additional sensors can be added as shown in FIG. 12, two sensors being illustrated but as can be appreciated three, four, or more sensors can be provided. The signal output from the respective filters 14 is fed into a preprocessing block 74. The block 74 carries out various functions including filtering, segmentation, and then as appropriate conditioning and then computing. The block 74 carries out the filtering as previously described to provide for a low pass filter, a high pass filer, or the appropriate filtering in order to remove signals not associated with the user attempting to speak a word and to isolate, segment, and present all motion that is associated with the user speaking a word. The process as carried in block 74 may be carried out by the microprocessor 16, and represent the process as explained herein with respect to FIGS. 3, 5, and 6. In particular, within the processing block 74, the functions are carried out to perform full voice recognition so that each spoken word is identified and the output clearly provided as an identified word from the module 74. Therefore, the module 74 may include one processor, the internet operating on the cloud, or other processing capabilities as described elsewhere herein. After the word is identified, it is output to a synthesizer 76 which converts the signal to a spoken word which is provided on a speaker associated with the user as previously described.

FIG. 13 illustrates one method by which a classification model or function can be created by collecting speech information from the user and training the neural model. According to the flowchart of FIG. 13, in a first step 100, a word is provided to the user to prompt them to speak the particular word. This prompt can be in the form of the presentation of the word on the screen which a user is viewing, or the word being output on a speaker from the computer, such as being provided as an acoustic spoken word output from a cell phone, an iPad, or other training device. The particular word is therefore provided for the user that they are prompted to speak. This word is then spoken by the user in step 102. As the word is spoken, the accelerometer senses the bone vibrations and body movement or position in step 104.

In step 106, the bone vibrations and other movement of the user is stored as reference data as corresponding to the selected or prompted word. Thus, a match or a relationship is stored that links the prompted work with the collected signals from the accelerometer. The word which has been identified by the system, might be acoustically quite different from a non-impaired speaker, such that the relationship ties the speech pattern to the prompted word to be provided to the neural model. For example, the words prompted to be spoken might be "good morning" and the acoustic output from the user might be a sound similar to "grr," or a sound similar to "gmmm," or other sound which the user is capable of making based on their current physical ability. The data is stored for the selected reference or prompted and if more samples of the prompted word is beneficial for the training, the user will be prompted again, see step 108. The user is prompted to speak the word repeatedly through steps 100-108 in order to collect a plurality of samples of user bone vibrations based on that particular same word.

It is to be recognized that each time the user speaks a selected word that they have been prompted to speak, the acoustic sound they make may be somewhat different. The speaking of the same prompted word can continue as needed in order to confirm that a sufficient database or dataset has been built for that particular word in order to train the model to generate the function. This might mean the word is spoken three times, five times, or several dozen times, depending on the user and their ability to create the exact vibration patterns every time they speak the selected word. As the data is not processed in real-time, the system collects a large number of samples to process to train the function so the function can uniquely identify the selected reference word. Once a set of samples for a single word or phrase is complete, the system can present another word in block 109 and begin a new sample collection sequence, which is used to create a different label. In particular, the system advances to block 109 to provide a new reference word to the user and thereafter repeat the sequence of steps 100-108. This training sequence continues for as many words as the user wishes to have presented to them, which will be dependent on the end use, i.e., voice commands (a limited number of words and phrases) as compared to natural language speech recognition (a large number of words and phrases). Thus, in block 110, the query is made whether there are any other words to be trained. If there are additional words to be trained, then the sequence repeats through block 109 and if there are no more words to be trained. The different word samples may be stored in real-time or provided to the neural model after the sample collection phase. The sample collection phase may be conducted over a variety of different time periods, like over a couple of days or weeks, as approachable for the user.

In step 112, the stored data is used to train a classification model that will classify input acoustic signal into different labels. Each label represents a word that was selected in step 100 and spoken in step 102 by the user. In one embodiment, the classification model is a neural network. Artificial intelligence is applied in order to locate a pattern which is common to all the attempts to speak the same word and to distinguish one spoken word from a different one.

The user will repeat the sequence as set forth in FIG. 13 with the housing 12 at different locations if the user desires to use different housings at different times at different locations on the body. For example, the user may collect spoken data in step 102 with the housing 12 that is configured to be adjacent to the neck, and then carry out the sequence again with the accelerometer positioned in a housing on the chin, in the palate, adjacent the ear bones, or other locations. Each time the data collection is carried out, a signal is provided from the accelerometer indicating the location of the accelerometer at the time the collection takes place. Thus, the collected information identifies the location of the accelerometer at the time that the signal was collected. The classification model is then trained with those location data along with the spoken words and bone vibration. Later, when speech recognition is being carried out, the signal output by the accelerometer will include information identifying the location of the accelerometer on the user's body at the time that the word is spoken. This permits the classification model to correctly classify bone vibration signals originating from different placement of the accelerometer on the user's body when a word is spoken.

Figure 14:
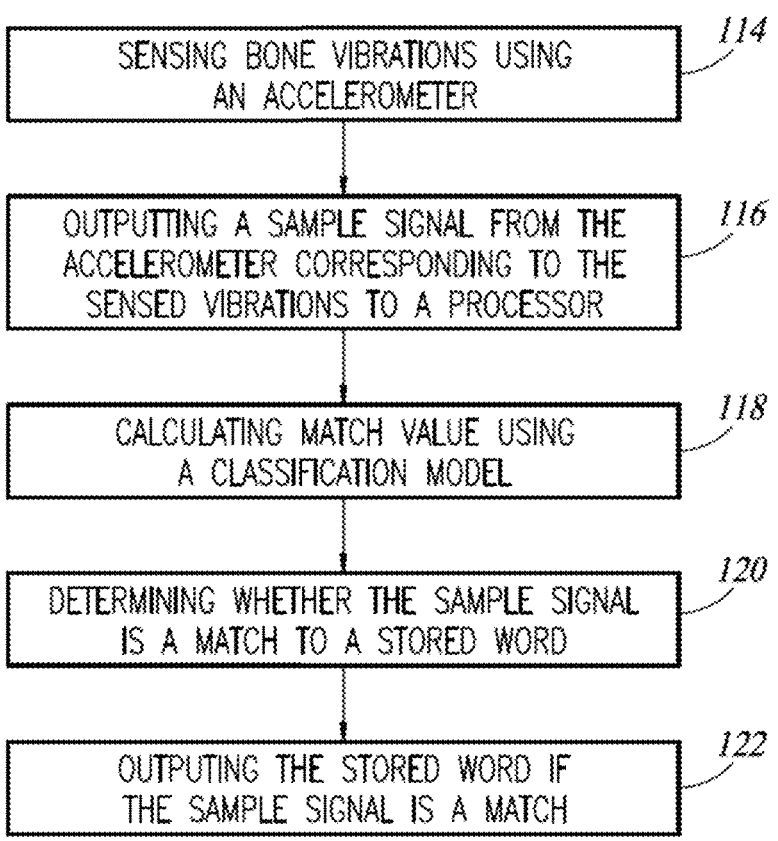
FIG. 14 illustrates a method of speech recognition according to the system as described herein.

FIG. 14 illustrates a method of speech recognition according to the system as described herein. As shown in FIG. 14, bone vibrations are sensed using an accelerometer 14 positioned adjacent to a human body in step 114. The vibrations that are sensed by the accelerometer are sent as a sample signal from the accelerometer 14 to the processor 16. The sample signal is the input of the user speaking a word, which they desire to be recognized by the system. In step 118, the sample signal is fed as input to the classification model. This is carried out in the processor 16, or at a remote server, or on the cloud or other locations as previously described herein. In step 120, it is determined whether the classification of the sample signal is a match to a stored word. As previously stated, the signal from accelerometer 14 will indicate to the processor the location of the accelerometer at the time that the vibrations were sensed. Accordingly, the sample signal will be processed by a classification model trained on a database or collected sample dataset that corresponds to the reference signal or sample signal that was created by using the accelerometer at the same location.

In some embodiments, the classification model will be provided to the housing directly so that none of the voice recognition or speech detection is processed remotely form the housing. In other embodiments, the classification model may be stored and accessed remotely from the housing, such as delivering, in real-time, collected voice or vibration data.

Once the classification model is trained, the user can start speaking the commands or communicating for voice recognition into the housing. The classification model will identify the associated label that corresponds to the spoken vibrations. This can be associated with step 120. The matched stored word is then output in step 122. This output may be a plurality of labels from the classification model that are evaluated in 118 and 120, where a decision is made about a most relevant one of the plurality of output labels. Once the most relevant label (such as one with a highest percentage) is identified and the identity of that word is provided to the system so that it can be provided as the output in 122. Once the identity of the word is output, the system can provide it as text on a display, audibly, such as a spoken word from a speaker, or other output as may be desired by the user, like tactile feedback.

In an alternative embodiment, if more than one reference signal is within the threshold value of the sample signal, both words are provided and the user may have the option to select which word they wish to present, such as by selecting one from a text option, hearing it spoken or, in one embodiment, both words can be spoken out of the speaker so that the users can hear both words and determine, based on the context, which word was intended to be spoken.

Described herein is a system and method by which people with disabilities which would otherwise render them unable to speak intelligible words to others are now able to say words which will then be provided to those in their presence, and they can be easily understood and carry out normal conversations. Thus, people with extensive disabilities, whether injury to the larynx, vocal chords, jaw bones, or, as frequently happens, older people who are missing a number of teeth, that have not been able to clearly communicate with those in their presence, can now do so easily according to the system as taught herein.

If a user becomes particularly proficient at creating a sample for a word or phrase, it will be possible for the user to create the database, dataset, or training data using only one input for each word and also to have a fairly large database of identified words. For example, an experienced user may be prompted to read an entire paragraph, or perhaps a text or small book having a large number of words therein. As the user speaks the words, the identity of the words spoken can be input by the user from a keypad or other source telling the system the word that they have just spoken or that they are about to speak. The user using this technique can read a large number of words in a short period of time, and thus build a very large database. Alternatively, the user may be presented on the computer with a paragraph to read, and the words are each highlighted in sequence, and the user speaks the highlighted word and then moves to the next highlighted word, and subsequently to any highlighted words in the presented message. The user therefore will be able to, in many instances, read a text from the computer, such as several pages as presented on the display monitor, and as they read each highlighted word, the system will match the word being spoken with the word that is highlighted in the display text, and the user will be able to build a very large database having many words therein that correspond to the words that the user may desire to speak. In further alternative embodiments, the user may type a sample text into the keyboard, which contains words which they wish to have recognized. The user can therefore type a letter, a paragraph, or obtain from another source a large sample of words that corresponds to the words that the user wishes to have recognized and stored in the system. After the user inputs the words to be recognized into the system, the user can then prompt the system to present those words in a particular sequence and speak the words as they are presented to the user so that they build a database having words of their own selection that corresponds to the words that they wish to have recognized.

The accelerometer signal is processed by a neural model (inference process); the output of this process is a classification of the input signal in one of the possible output classes/labels. Each label represents a word belonging to the dataset used in a previous and separate time to train the neural network. The selection of the output label can be done in different ways. The simplest choice is to select the label with the higher value. Other techniques, for example, can be based on the observation of successive inference outputs. A filter can be built on these for observing, for example, occurrences of a class label in a time-window.

According to the techniques as disclosed herein, a person is therefore able to function more normally in social settings, even though they may have significant disabilities with normal speech, offering significant advantages to those people who previously have not been able to enjoy verbal conversations.

Figure 15:
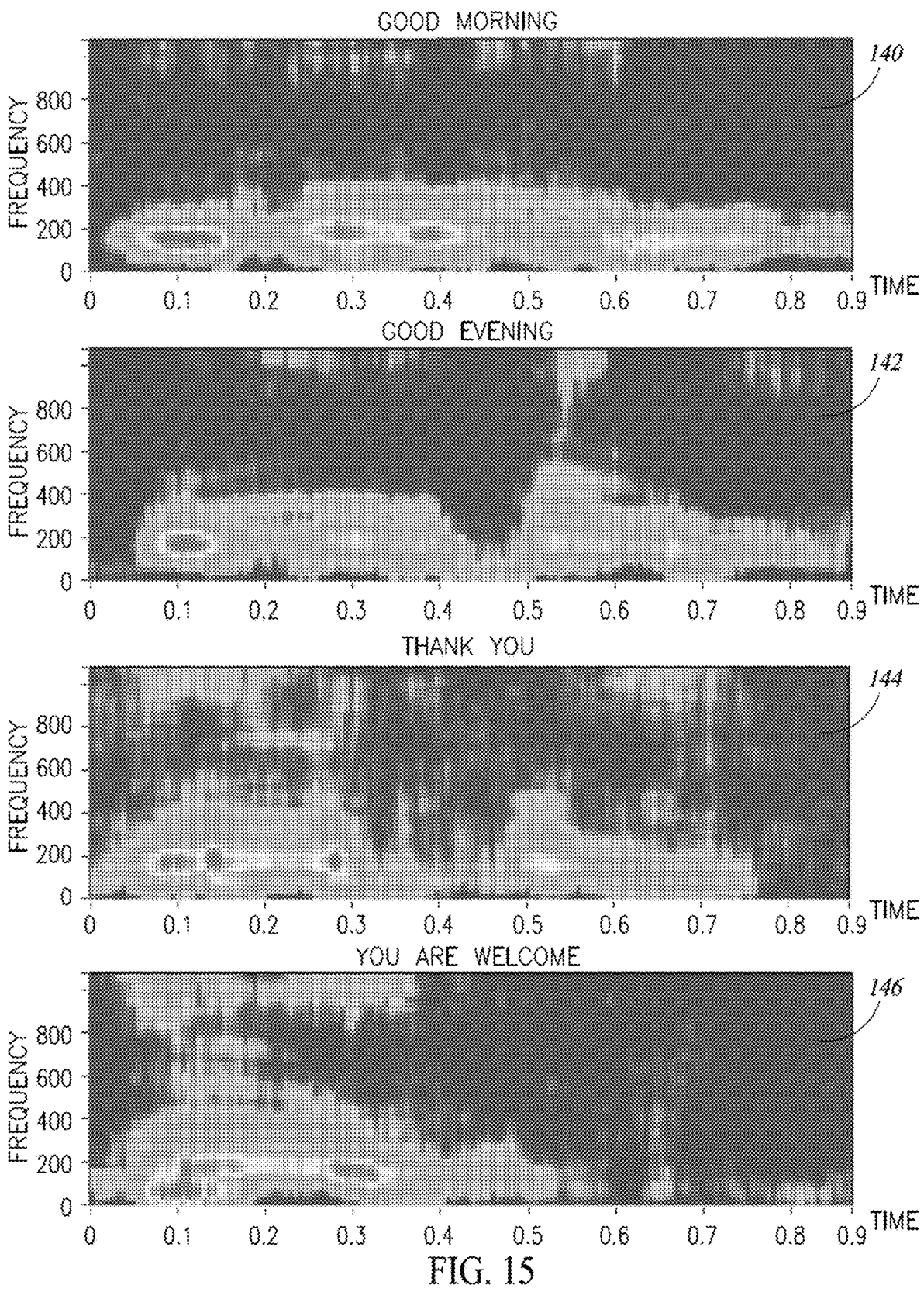
FIG. 15 is data collected based on bone conduction sensing of different phrases as they are spoken.

FIG. 15 provides four different plots of data collected using one or more of the bone conduction accelerators sensing vibrations in the bones as the phrases good morning, good evening, thank you, and you are welcome as they are each spoken by a person having difficulties with normal speech. It is noted that the language being spoken that created these plots of FIG. 15 is Italian, however, corresponding frequency plots would be obtained if the words were spoken in any language and the same principles that are presented herein apply to any language. The presentation of the phrase translated into English in this disclosure is provided for ease of reference. The first plot 140 shows the frequency response of the phrase "good morning" over time, with the intensity of the signal shown in the grayscale, as the phrase is spoken. Similarly, the plot 142 shows the phrase "good evening" over time, the plot 144 shows the phrase "thank you" over time and the plot 146 shows the phrase "you are welcome" over time. Each of these respective frequency plots will have a specific signature based on the individual who was speaking the words. Unfortunately, because the bone conduction that results from a particular spoken word is very different from one person to another, particularly for a person that has difficulty speaking in audible words, the frequency plots will not be consistent from one person to another. The inconsistency will be sufficiently great that it is not possible to build a reliable model that will work for all people having significant speech difficulties that will universally apply. This will now be explained.

Figure 16A:
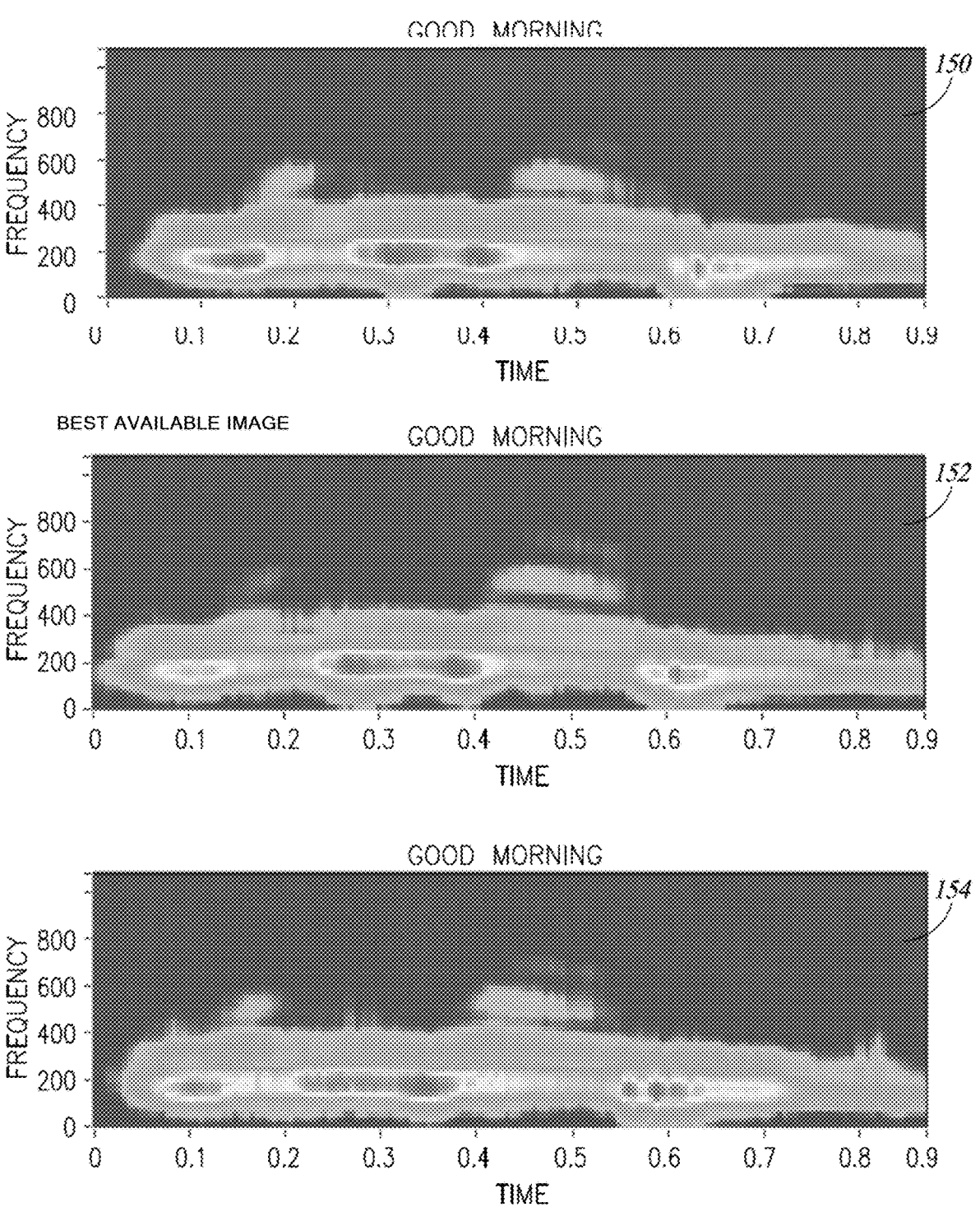
FIG. 16A is data collected of the same phrase from three different individuals with no language difficulties.

FIG. 16A is data collected of the same phrase, "good morning" from three different individuals with no language difficulties, while FIG. 16B is data collected based on bone conduction of the same phrase from three different individuals who have significant language difficulties. A review of the spectrogram frequency plots 150, 152 and 154 in FIG. 16A show that they are very similar to each other, even though three different individuals spoke this phrase. A general speech recognition engine should be capable of recognizing the phrase "good morning" spoken by these three different individuals. No particular training will be required of the database and recognition system. On the other hand, FIG. 16B illustrates the very same phrase "good morning" being spoken by three different individuals that are not capable of speaking audible words and therefore an audio signal cannot be collected. Instead, bone conduction signals are collected from an accelerometer for the three different individuals in the output frequency is drastically different for each of them.

As can be seen, the first speaker in spectrogram plot 160 has significant signal data during the time period of 1.2 seconds to 2.2 seconds and little to no data at any other time in the speaking of the phrase. On the other hand, the spectrogram plot produced by speaker 162 has a very different frequency response, both as to the timing, and the amplitude and the frequency of the various signals picked up from the bone conduction. The speaker producing the spectrogram plot 164 has yet a different output signature for their frequency plot which is not very similar to the plots 160 or 162. Accordingly, there is a question whether it is possible, using conventional software, natural language processing or machine learning to create a database that will properly recognize phrases spoken by a user with speech difficulties when the frequency signals collected are using bone conduction.

Figure 17A:
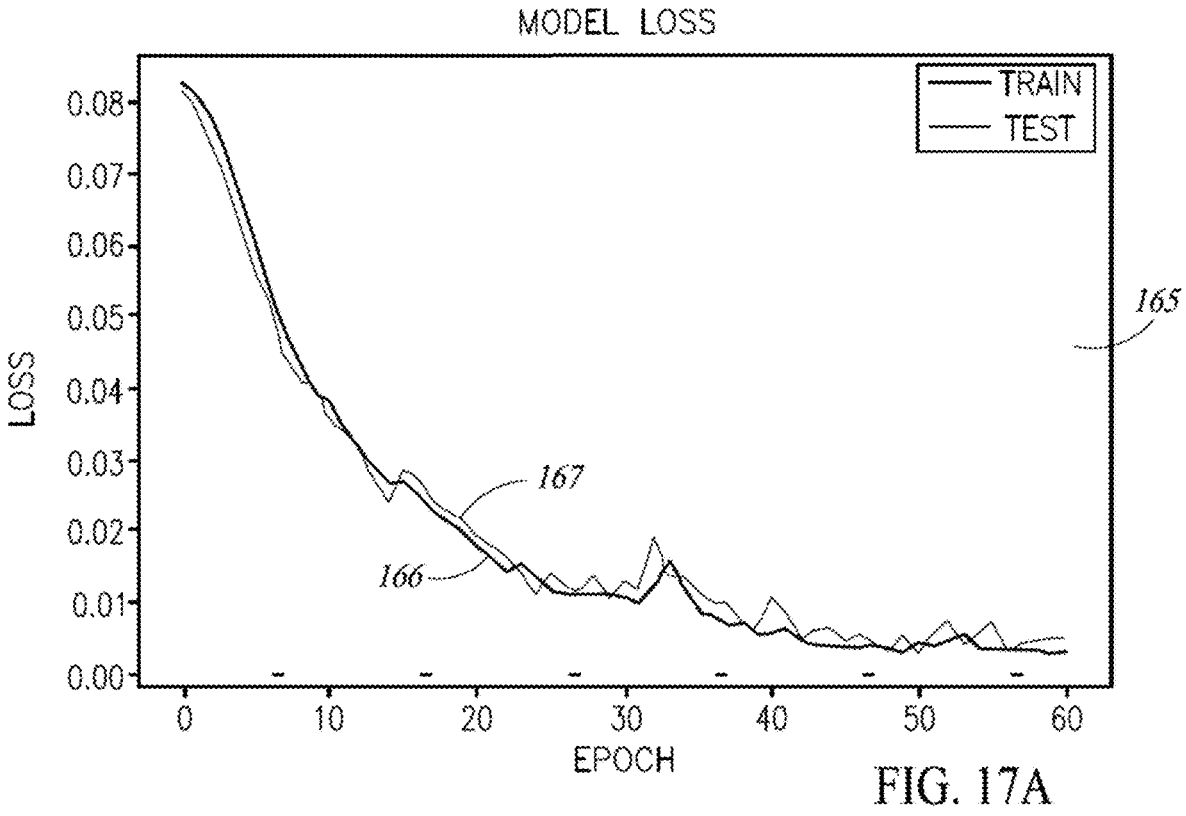
FIG. 17A is a graph of the loss model using a first type of recurrent training for voice recognition of individuals speaking clear, audible words, without language difficulties.
Figure 17B:
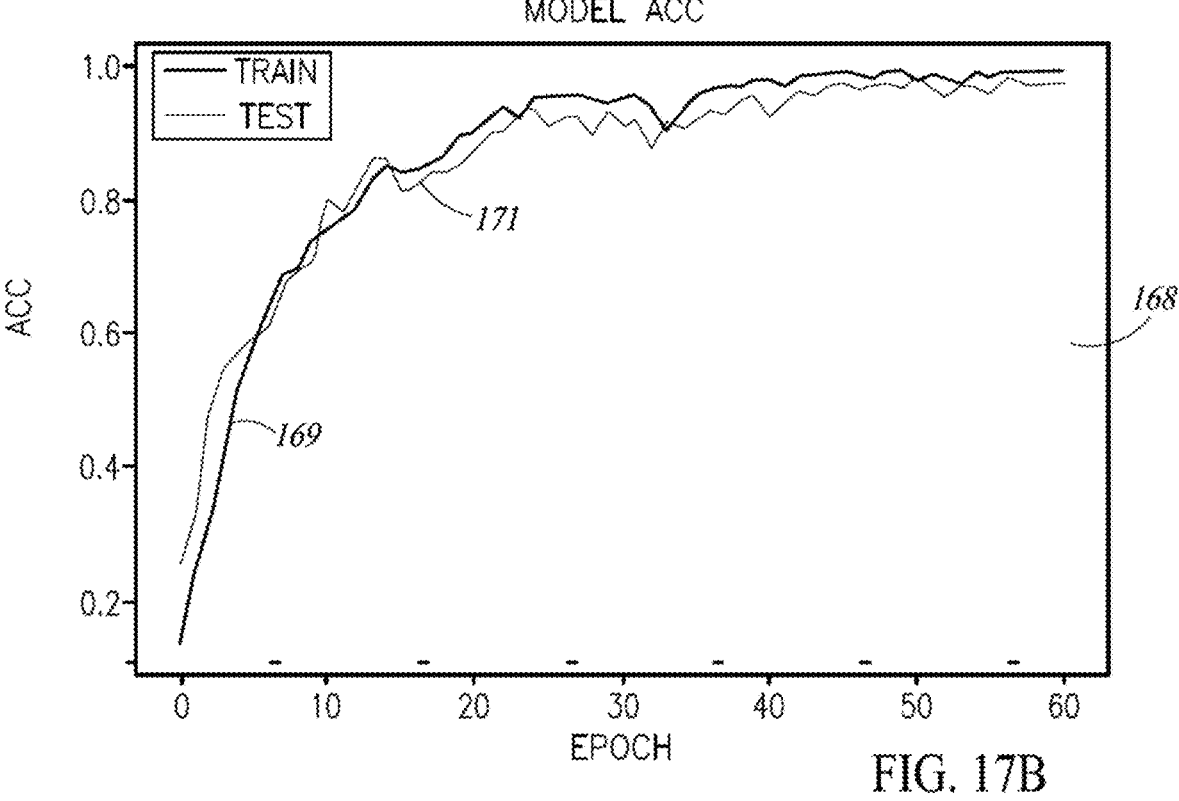
FIG. 17B is a graph of the accuracy of the model using the first type of recurrent training for voice recognition of individuals speaking clear, audible words, without language difficulties.

The use of standard LSTM neural network to perform voice recognition of person speaking, clear audible words with no language difficulties is illustrated in FIGS. 17A and 17B. More specifically, FIG. 17A is a graph of the model loss using a first type of recurrent training for voice recognition of individuals speaking clear, audible words, without language difficulties. FIG. 17B is a graph of the accuracy of the model using the first type of recurrent training for voice recognition of individuals speaking clear, audible words, without language difficulties.

The phrase, good morning spoken by different individuals who can clearly speak audible words with no language difficulties as shown in FIG. 16A is the type of data that was provided to the standard LSTM neural network to perform voice recognition as shown in the graphs of FIGS. 17A and 17B. The model loss, as shown in graph 165 has a number of training samples as shown by line 166. As can be seen in graph 165, the loss rapidly decreases from 0.08 approximately 0.005 after 50 samples. This indicates a low model loss and that the machine learning is capable of being trained. After this, a number of test data samples are collected as indicated by test line 167. During the testing, the loss also decreases from approximately 0.08 to approximately 0.01 after 40 samples and continues to decrease to approximately 0.005 after 50 sample periods. This indicates that the software used for the machine learning is effective to recognize the spoken word with low loss. In addition, the training data set and the testing data set converge towards zero, further indicating that the software is able to perform the requested function.

Graph 168 in FIG. 17B shows the accuracy model on the same data set, collecting samples of words clearly spoken audibly. During the training, as the samples are collected, the accuracy approves from below 20% after the first few samples to approaching 100%, namely 1.0 after 40 samples and getting closer to 100% after 60 samples, as shown by line 169. A test is then conducted on test samples as shown by line 171 and as more samples are tested the accuracy also improves from below 40% to approaching 100% after 50 or 60 samples. The two lines converge, and approach 100%, thus demonstrating that for normal spoken audible words, the currently available neural network and software program are acceptable to perform voice recognition for clearly spoken words of the type shown in FIG. 16A.

Figure 17C:
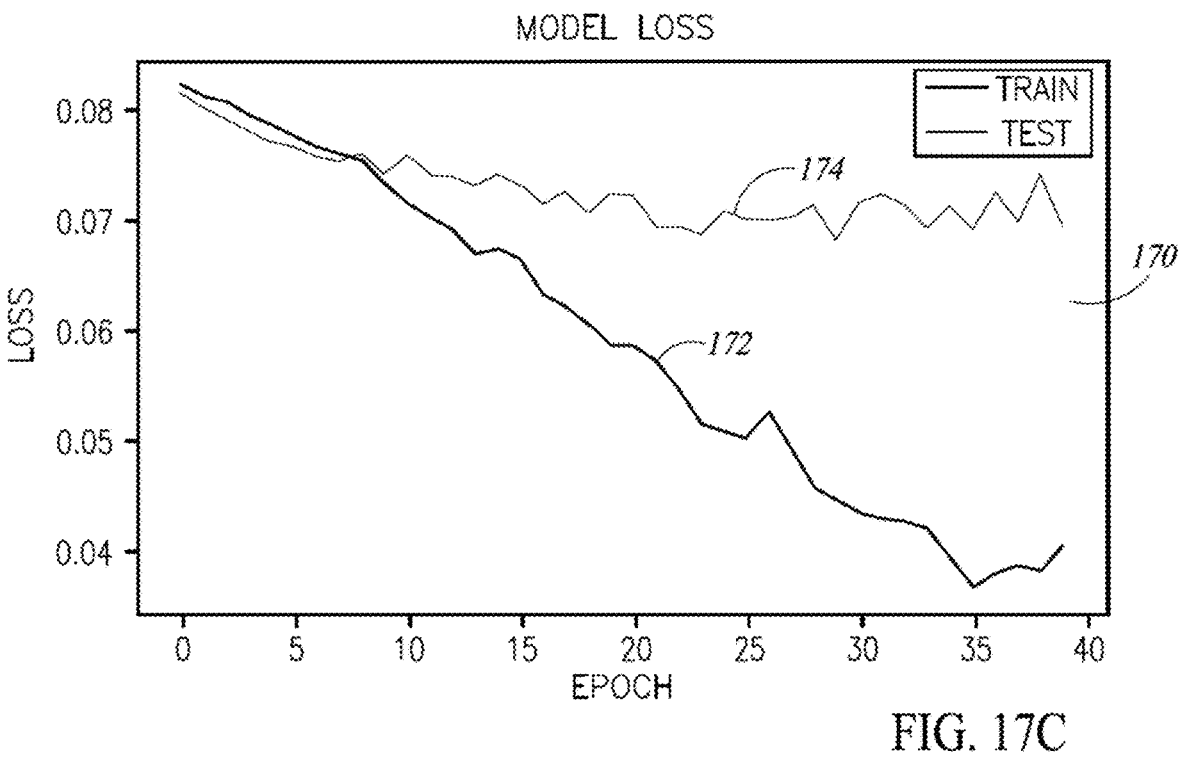
FIG. 17C is a graph of the model loss using a first type of recurrent training for voice recognition of individuals with significant vocal and audio language difficulties.
Figure 17D:
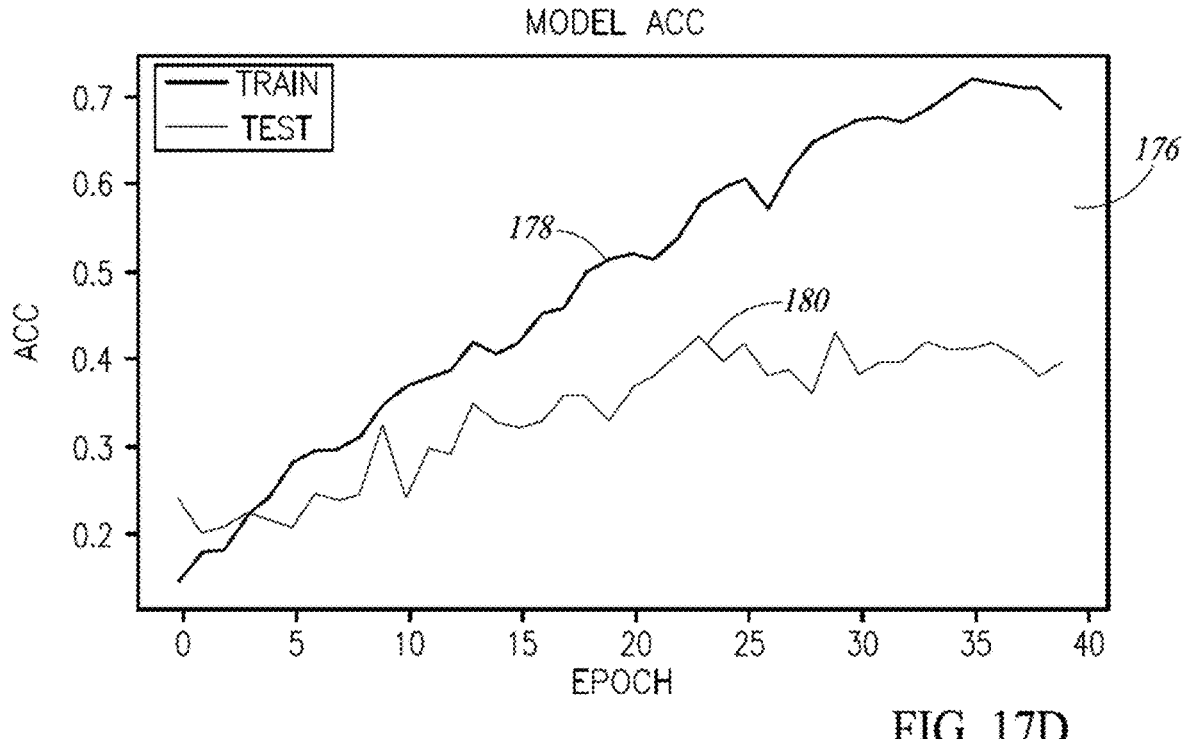
FIG. 17D is a graph of the accuracy of the model using the first type of recurrent training for voice recognition of individuals with significant vocal and audio language difficulties.

A first attempt is made as illustrated in FIGS. 17C and 17D to perform word recognition of a person who has significant difficulties speaking audible language words making use of the same machine learning tools of FIGS. 17A and 17B used for standard audio speech of a person talking without language difficulties. The same standard LSTM neural network that was used for the recognition of a person speaking clear, audible words with no language difficulties that was used for FIGS. 17A and 17B was applied to attempt recognition of a person with significant speaking and audible language difficulties. In order to train a model to understand and properly recognize the words spoken by users with speech difficulties, various samples were collected and analyzed. In the first attempt using machine learning, a standard recurrent neural network was used that makes use of the long short-term memory (LSTM) of an artificial recurrent neural network in an architecture in order to perform deep learning of the data provided in FIG. 16B. LSTM neural networks are well known in the art and therefore will not be described here in detail with respect to their use in artificial recurrent neural networks for voice recognition. When this type of machine learning is applied to data of the type of FIG. 16B, that was applied to data of the type from FIG. 16A, the plots of FIGS. 17C and 17D are produced, which provide a measure of the loss and the accuracy of this type of machine learning network to properly characterize and recognize the word, respectively.

FIG. 17C is a graph 170 of the model loss using a standard LSTM network in which, during the training sequence, the recognition by the system of the phrase repeatedly spoken begins with the loss of approximately 0.08 after five epochs as shown by line 172, namely, after five samples had been taken and then advanced to having a loss of less than 0.04 after 35 samples, namely 35 epochs had occurred, line 172. Once the system was believed to be sufficiently trained in order to properly operate with low losses, a testing was conducted to determine the accuracy of recognizing the spoken trained word as illustrated in line 174. As can be seen in the graph 170, the loss after five samples was approximately the same value as the training model for the testing sequence shown in line 174. However, as the number of tests continued to be conducted, the testing sample did not improve on the model loss. Instead, the model loss stayed above 0.07 even after 35 epochs. This demonstrates that the ability of the machine learning system using the standard LSTM artificial intelligence technique was not able to properly create a database that would recognize the spoken word. The failure of this model is further illustrated in FIG. 17D in graph 176, which is the accuracy model. As can be seen, in the model accuracy graph 176 of FIG. 17D, the training accuracy, as shown by line 178, increases from approximately 0.2 after three or four sample periods to about 0.7 after 35 sample periods. Accordingly, the training shows suitable progress. However, the training does not carry over to the actual recognition during the testing phase. During the testing, as shown in line 180, the accuracy of the word recognition is at approximately 0.2 after five sample periods and slowly rises to approximately 0.4 after 35 samples and does not show any improvement after sample 25. Accordingly, the accuracy model also confirms that while the neural network of machine learning appears to be trainable, based on the training set, it does not carry the learning over to the testing set of phrases and did not in fact create a database that would properly recognize the phrase despite repeated training.

The above machine learning on the phrase spoken audibly by a normal speaker has a model loss below 0.01 after 40 samples that is further reduced to below 0.005 after 60 samples. Similarly, the model accuracy increases from approximately 0.6 after 10 samples to approximately 100% after 40 samples. Further, the training model and the testing model convergent have the same response from the system. These graphs are not shown for ease of reference since they demonstrate the audio word spoken by a normal speaker.

Figure 18A:
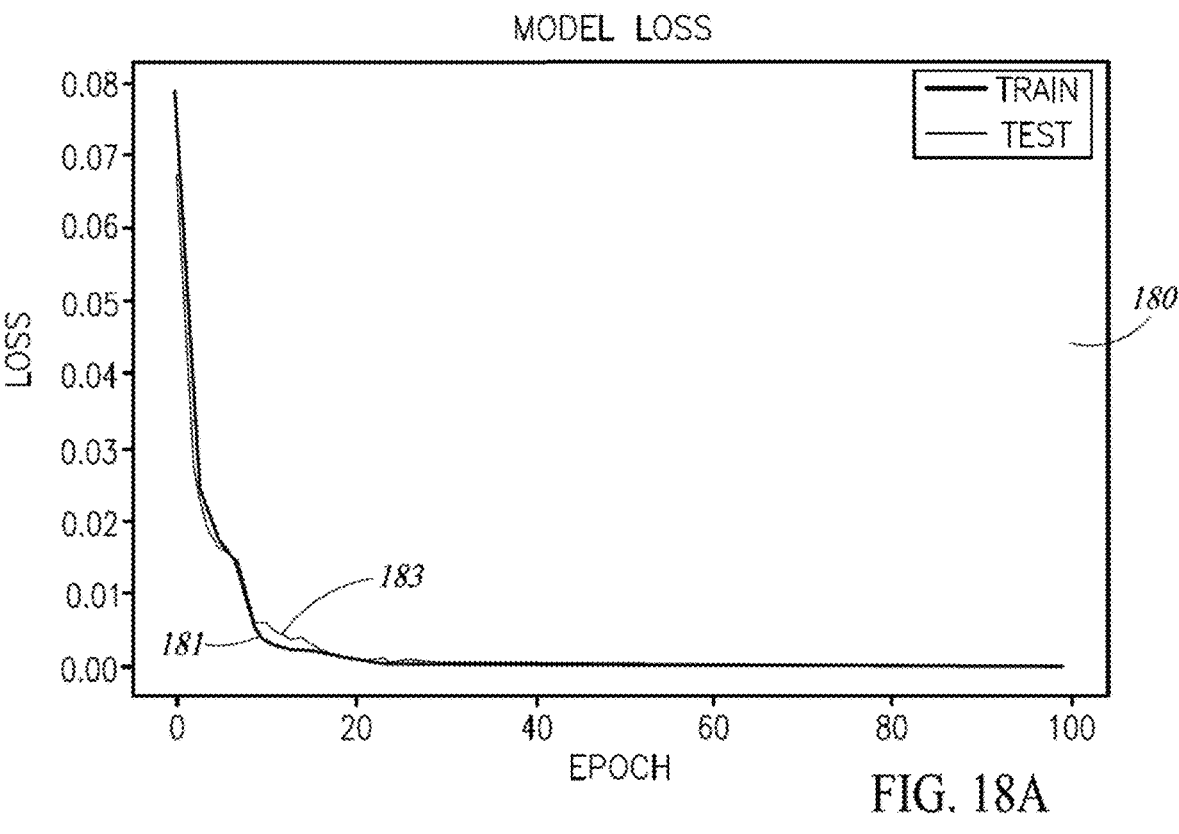
FIG. 18A is a graph of the model loss using a second type of recurrent training for the recognition of individuals speaking clear, audible words, without language difficulties.
Figure 18B:
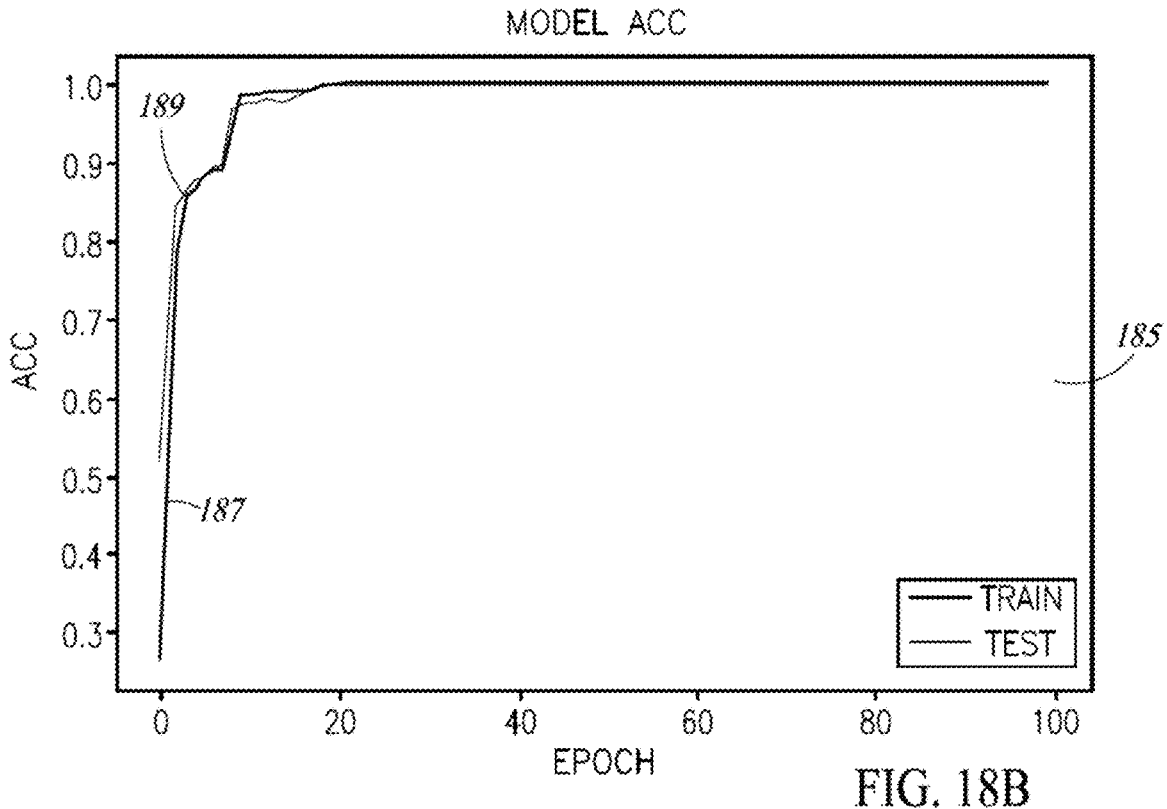
FIG. 18 B is a graph of the accuracy of the model using the second type of recurrent training for the recognition of individuals w speaking clear, audible words, without language difficulties.
FIG. 18C is a graph of the model loss using a second type of recurrent training for the recognition of individuals with significant vocal and audio language difficulties.
FIG. 18D is a graph of the accuracy of the model using the second type of recurrent training for the recognition of individuals with significant vocal and audio language difficulties.

Accordingly, a new machine learning technique is applied to the signals obtained based on the bone conduction of a user who is not able to speak in a normal fashion. According to principles of the disclosure, a new sequence of machine learning is applied that is based on a convolutional neural network. In a convolutional neural network, there is no loop in the network, only a feedforward. The data is convoluted within the core of the network. Convolutional neural networks, (CNN or ConvNet) are generally known in the art as an artificial neural network of a type that is commonly used to analyze imagery. The particular algorithm presented in this disclosure carries out a number of operations on the data in order to perform the word recognition. In addition, a significant number of specific steps are taken in a specific sequence as part of the convolutional neural network The algorithm as presented in this disclosure is shown and described with respect to FIG. 21, which is described later herein. Testing is therefore carried out on the algorithm for speech recognition to measure its usefulness in standard speech recognition of users with good audible characteristics, of the type shown in FIG. 16A. FIG. 18A is a graph of the loss model of the newly disclosed speech recognition software algorithm using machine learning and FIG. 18B is the accuracy model graph of the same disclosed algorithm.

Figure 21:
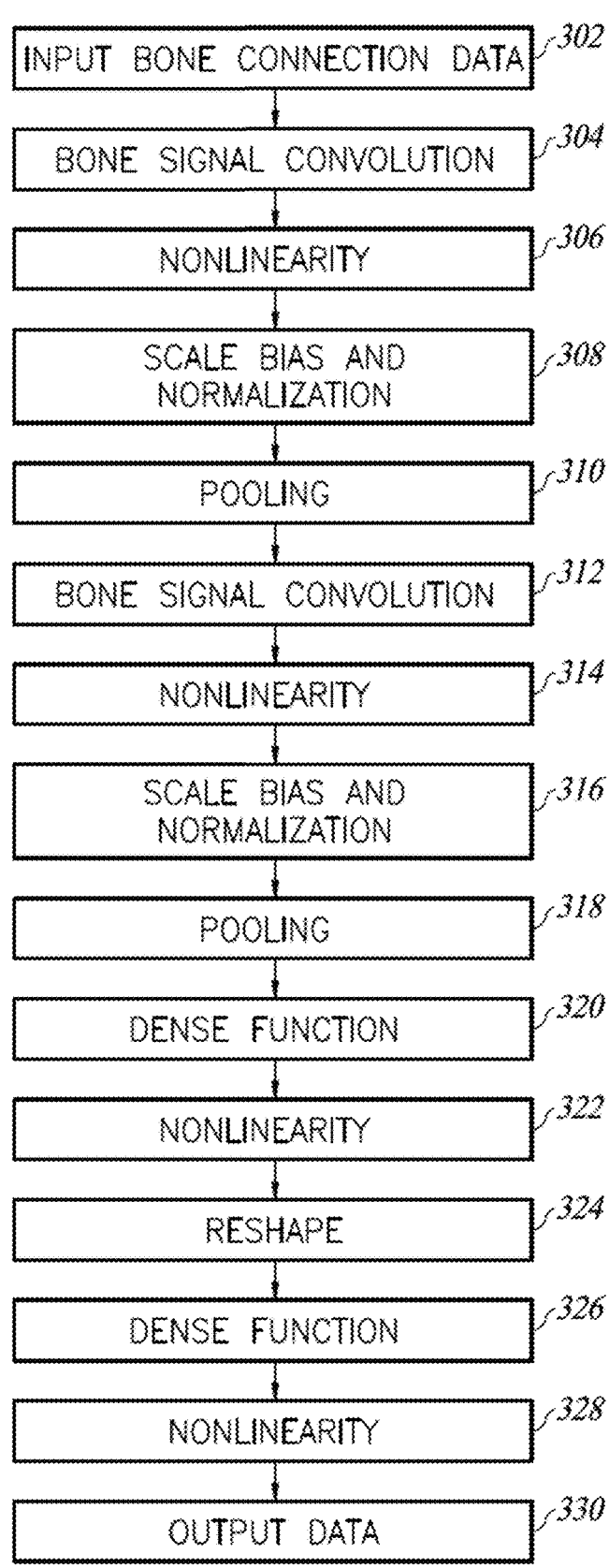
FIG. 21 is a flow chart showing an algorithm for word recognition using bone conduction sensing.

As can be seen in FIG. 18A, the graph 180 illustrates that the loss during the training portion quickly drops from approximately 0.082 to less than 0.005 after 20 samples and after 40 samples the loss is approximately zero and this continues for all future samples as can be seen viewing line 183. Similarly, when the test is carried out on test data, the model loss during testing quickly decreases from 0.072 to approximately 0.005 within 20 sample periods and approaches zero after 40 sample periods, converging together with the training samples. This indicates that the particular software algorithm experiences low loss in the machine learning and is a good indicator that it will perform well for speech recognition of people who can speak clear audible words. Similarly, the accuracy model as shown in graph 185 also demonstrates that the model accuracy of the disclosed algorithm in FIG. 21 can be trained to have high accuracy. As the training begins, the accuracy quickly increases towards 90% after 10 samples and after 20 samples is approaching 1.0, namely 100% of it remains at approximately 100% from 30 samples on to past 100 samples. Then, when testing is carried out on test data, the testing results converge with the training results and approach 0.9 after 10 samples and after 20 samples begin to approach an accuracy of 1.0, namely 100%. From 40 samples onward the accuracy of the testing models remains at about 100%. This further demonstrates that the software algorithm of FIG. 21 is highly accurate for standard speech recognition of persons speaking clear audible words. Indeed, comparing the graphs of FIGS. 18A and 18B to those of FIGS. 17A and 17B, it can be seen that the disclosed algorithm of FIG. 21 has fewer losses and approaches zero loss more quickly than the standard machine learning technique and further has higher accuracy and approaches 100% accuracy significantly more quickly than the standard machine learning technique that makes use of an LTSM neural network.

Figure 18C:
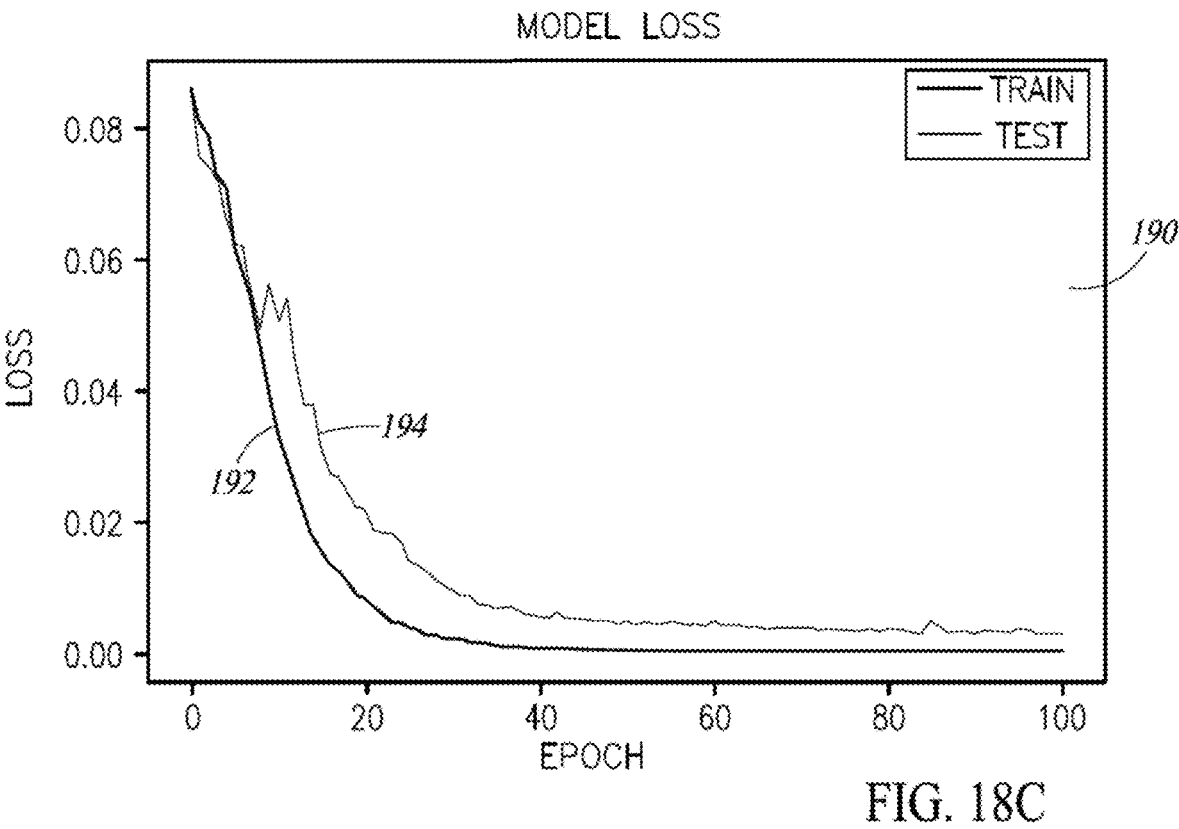
Figure 18D:
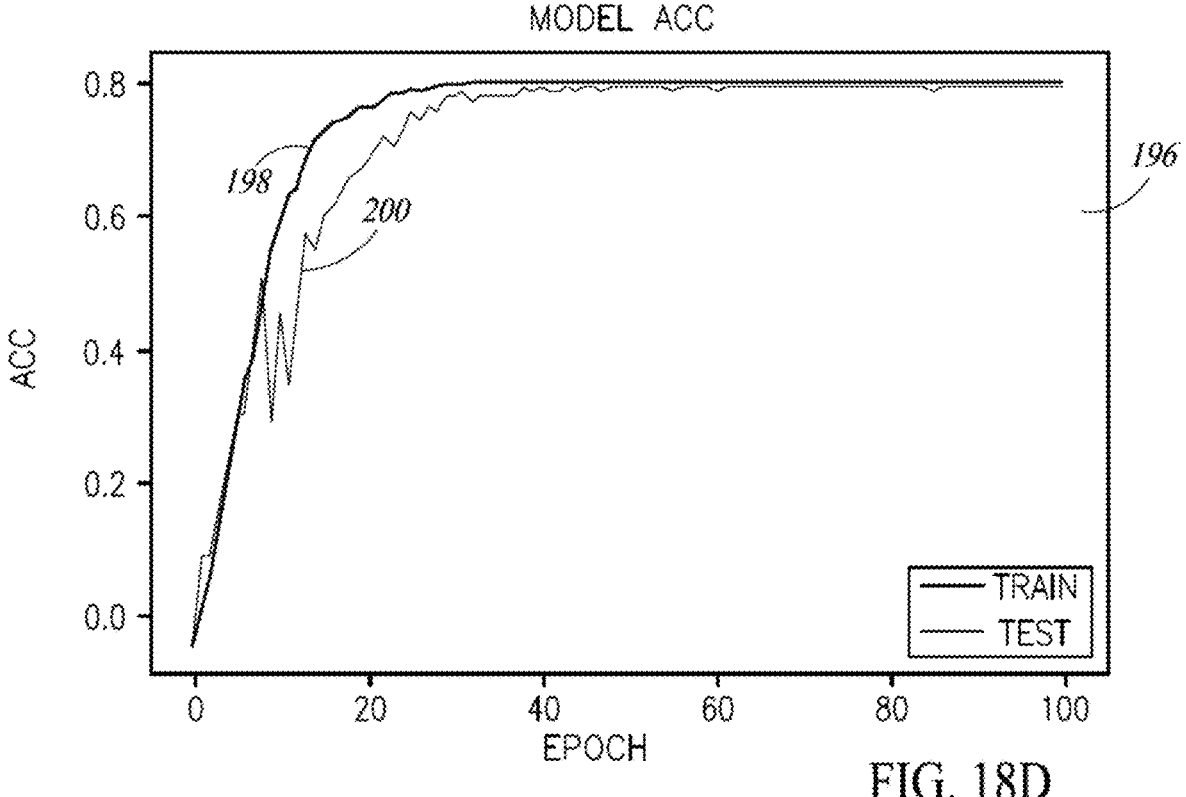

Having demonstrated that the disclosed algorithm of FIG. 21 is superior for use in standard audio voice recognition, data results will now be examined to determine the acceptability for use in phrases spoken by individuals with significant language and audible speaking difficulties. FIG. 18C is a graph of the model loss using the created machine learning sequence as a recurrent training and testing for the recognition of individuals with significant spoken language difficulties according to this disclosure. FIG. 18D is a graph of the accuracy of the model using the recurrent training for the recognition of individuals with significant language difficulties as introduced and taught in this disclosure. The particular sequence of the training and testing is shown in FIG. 21, which will be described later herein.

Turning now to the results of the disclosed machine learning technique as taught herein, FIG. 18C shows a model loss plot 190 in which the training set starts with the loss of approximately 0.08 after 2-3 training samples, then advances to a loss of approximately 0.005 after about 40 samples and to a loss of approximately 0.0001 after 80 sample periods. This is during the training phase as shown by the line 192 in the graph 190. Examining now the testing phase as shown by line 194, a testing of the database is carried out on approximately 100 samples of a user speaking the phrase in which the signal is picked up by bone conduction by the accelerometers. At the start of the sample, the model loss is approximately 0.08, and then it also decreases rapidly to approximately 0.02 after 20 samples and to approximately 0.015 after 40 samples and then further reducing to approximately 0.005 after 100 samples. Accordingly, the testing sample as shown by line 194 converges towards zero loss even after many tests. This demonstrates that the machine learning using a convolutional neural network at different steps in the sequence is able to be trained and perform proper recognition of the spoken words based on sensing the bone conduction signals of a person who is not able to speak audio words in a normal fashion.

Returning to FIG. 18D, the accuracy of the disclosed neural network and machine learning is shown in graph 196. The model accuracy begins at approximately zero with zero samples and then rapidly increases to approximately 0.8 during the training, as shown in line 198. Namely, the accuracy becomes approximately 80% during the training phase. The testing phase is then conducted as illustrated by line 200. During the testing phase, the accuracy of the testing model is approximately the same as the training model after 5 to 10 sample periods. Then, between 15 and 25 samples, the training model increases to an accuracy from about 40% to above 60%, however, not us rapidly as the training model increases during that same sample period. Then, after approximately 40 samples, the testing model continues to improve and reaches approximately 80% and after 60 to 70 samples is equal to the training model. Accordingly, the accuracy of the training model and the testing model converge after approximately 40 sample periods. This demonstrates that the disclosed machine learning technique as taught herein is effective in order to perform recognition of signals of the type shown in FIG. 16B of bone conduction sensing using accelerometers as disclosed herein.

FIG. 21 is a flow chart showing an algorithm for word recognition using bone conduction sensing that was used to create the plots 190 and 192 of FIGS. 18C and 18D. This will now be described in detail. In step 302, there is the input of bone conduction data, which can be considered to correspond to what would have been audio data if the user had been able to speak. However, the particular user has difficulty creating audible speech and therefore the accelerometers are placed adjacent to the user's bones as disclosed elsewhere herein. After the bone conduction data is input to the system, a convolution is carried out on the bone conduction signal, showing 304. This convolution is carried out using the same types of technique as used for audio convolution. Namely, in this convolution step 304, the process of care is carried out by multiplying the frequency spectra of the two sources of the signal, the input signal and the impulse response. By doing this, the frequencies that are shared between the two sources are amplified and accentuated while the frequencies that are not shared between the two sources are attenuated. This will cause the input signal to take on sonic qualities that correspond to the impulse response. In addition, the characteristic frequencies from the impulse response that are common to the input signal will be boosted. Techniques of convolution are described in published literature. It is sufficient to say that the convolution techniques as taught with respect to spectrograms for audio signals is applied to the bone conduction signal with the result that the input signal is able to take on sonic qualities and thus a more accurate analysis can be carried out.

After the convolution is carried out in step 304, a nonlinearity function is performed on the results and signal from the convolution. The general use of nonlinearity functions in machine learning is that the neural network will approximate functions that do not follow linearity to successfully predict the class of the function. Therefore, in step 306, the nonlinear function provides a mapping between the inputs and the response variables with the purpose of converting the input signal to a node of the convolutional neural network to a modified signal that is then output to the next layer where it becomes an input to the next step in the sequence as shown in step 308. There are number of scholarly articles on nonlinearity functions and machine learning in the general concept, and such functions are applied to the output of the bone signal convolution of step 304 during step 306 and that signal is then advanced to step 308 where scale bias and normalization is carried out. In the scale bias sequence, as carried out in step 308, a different weighting is given to different scenarios within the data. The model is tested to see if the performance remains the same if one data point is changed, or different samples of the data are used to train or test the model. Different weighting is applied to the different parts of the convoluted signal in order to more accurately recognize the different parts of the phrase as it is sensed during the bone conduction. Each aspect of the spectrum is provided and weight biased during the training sequence. The scale bias is applied across the signal in order to test the accuracy of the training during the different training samples. The scale bias is carried out during the training when it is known exactly which word is being spoken in order to determine the proper weighting to be provided to different parts of the spectrum. The scale bias can therefore be determined and used on the testing samples. Further, in step 308 a normalization is carried out. The normalization of this machine learning sequence is the process of translating data into a range that has the same scale for all signals. Namely, a standardized distance is used within the algorithm, for example, to transform the data into a unit sphere or some other normalization technique. This is also tasked to carry out the weighting and normalize the weighting of the different parts of the spectrum as carried out by the scale bias. Pooling is then carried out in step 310 on the signal after the scale bias and normalization has been applied. Within machine learning, a pooling layer is used to accumulate the features from the maps generated by convoluting a filter over an image. Namely, the pooling is carried out in which the generalized features are extracted from the bone convolution signal created in step 304 which helps the neural network recognize features independent of their location within the spectrograph and the signal is a whole. While convolutional layers are the basic building blocks of a convolutional neural network the use of the pooling layer at this stage in step 310 is to provide a filter that is applied to the map of the convolutional signal then present in the system and the pooling filter calculates an output that is part of the feature map based on the filter.

The output signal from the pooling step in 310 is then subjected to another convolution, step 312. This is a bone signal convolution that is similar to the type carried out for an audio convolution. As previously noted, convolution is the combining of two signals to form the output signal and the same type of convolution is carried out in step 312 as previously described with respect to step 304. This step, however, is carried out after the pooling function and therefore provides a further refinement of the signal. After the second convolution step in 312, the nonlinearity step is repeated again in step 314 on the output of the signal from the convolution step in 312. The nonlinearity function of step 314 is carried out in a similar fashion as previously described with respect to step 306. After this, at step 316 the signal is subjected again to scale bias and normalization function after which pooling is carried out on the signal as indicated by step 318.

The output signal from step 318 is then subjected to a dense function for an audio signal in machine learning. This dense function implements the operation of the output is equal to the activation of the input kernel plus weighting bias. Specifically, the dense function implements the operation: output=activation(dot(input, kernel)+bias). In this equation, activation is the element-wise activation function passed as the activation argument, kernel is a weights matrix created by the layer, and bias is a bias vector created by the layer (only applicable if use_bias is True). These are the basic attributes of the dense function, step 320. This dense function is a type of layer in a deep neural network that uses the linear operation wherever input is connected to every output by a weight. The general concept of a dense function in machine learning is generally known, as is the use of a dense layer in a neural network. The particular concept of the dense function is carried out in step 320 after the pooling of step 318, thus providing a more complete signal for performance of the recognition of the word being spoken that is sensed by bone conduction of the person who has a significant speech impediment. After the dense function step 320, a nonlinearity is carried out in step 322 of the process previously described after which a reshaping of a signal is carried out in step 324. The shaping of the digital audio signal is carried out to increase the apparent signal-to-noise ratio of the signal output by the nonlinearity step in 322. It may be carried out just as a reshaping function, or as part of a dithering function. The spectral reshaping of the audio signal can be done dynamically to provide smoothing of the spectral content and avoid abrupt changes in the signal content. Various techniques are known for performing spectral reshaping of audio signals, one technique of which is described in U.S. Pat. No. 10,230,411.

After the reshaping is carried out in step 324, the dense function is performed again step 326 and then the nonlinearity function is applied to the signal 328, after which the output is provided in step 330 on which the recognition is performed by comparing the signal to signals in the database to determine whether there is a match for a word or a phrase in the database.

FIG. 21 therefore provides a sequence of steps according to the present disclosure by which a signal collected from bone conduction data is modified through different layers of a machine learning algorithm and the resultant data output in step 330 has been properly conditioned on which the recognition of the spoken phrase can be performed. Advantageously, the entire network including the algorithm of FIG. 21 is running on a single processor. This model can be fully loaded into a standard microprocessor, one example of which is the ST 32 microprocessor family. One specific example is the STM 32F746G. This particular processor has sufficient onboard FLASH and RAM to carry out the algorithm as disclosed herein. Importantly, the proper classification and recognition can be executed directly by the local processor, on the EDGE of the system without access to the cloud or other large server farm having many thousands of processors. The model can contain the appropriate metric for weights, namely the use of the weighting compression and weighting quantization within the machine learning network.

Figure 19A:
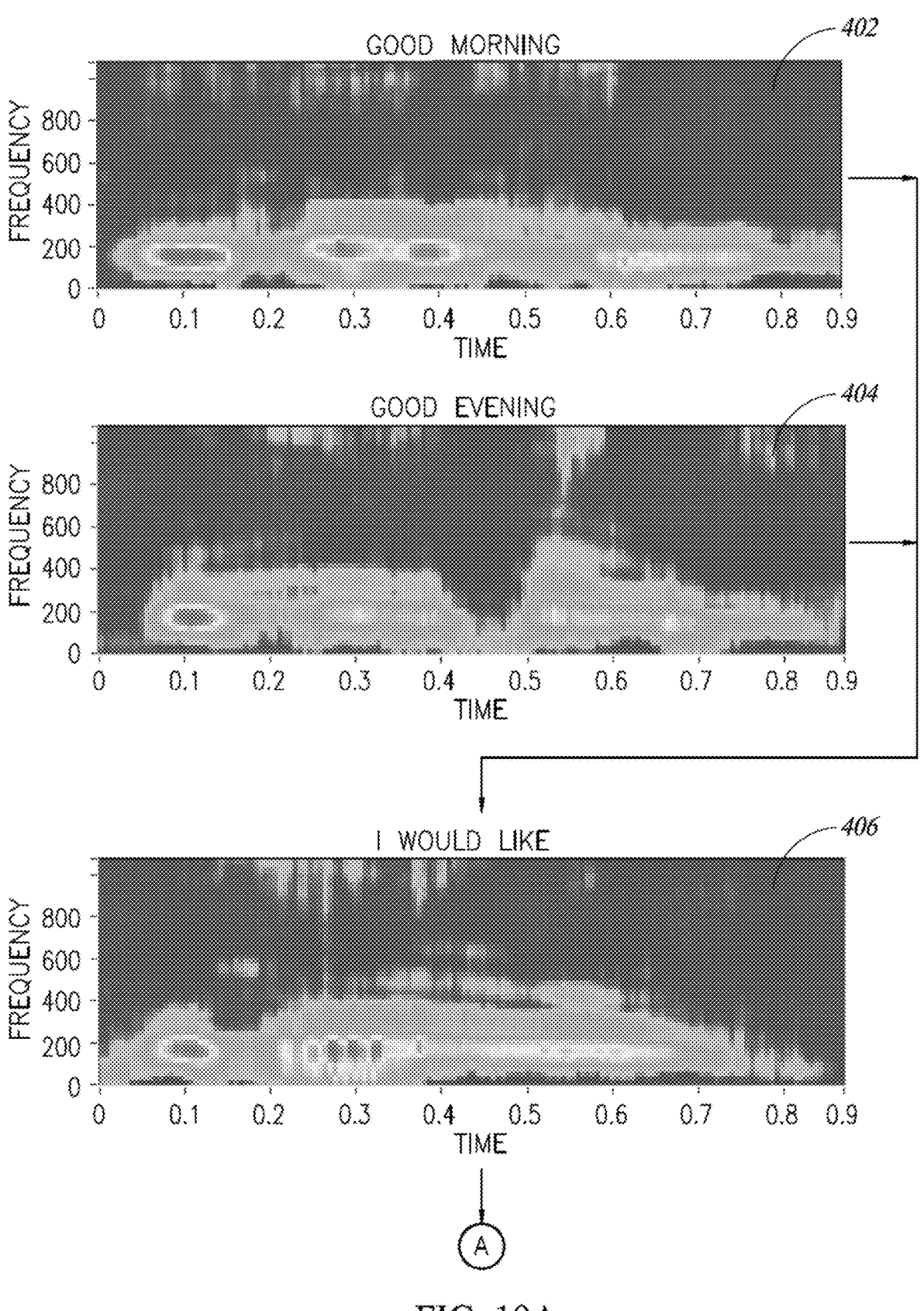
FIGS. 19A and 19B illustrate sentence structure building using accelerometers for bone conduction sensing.
Figure 19B:
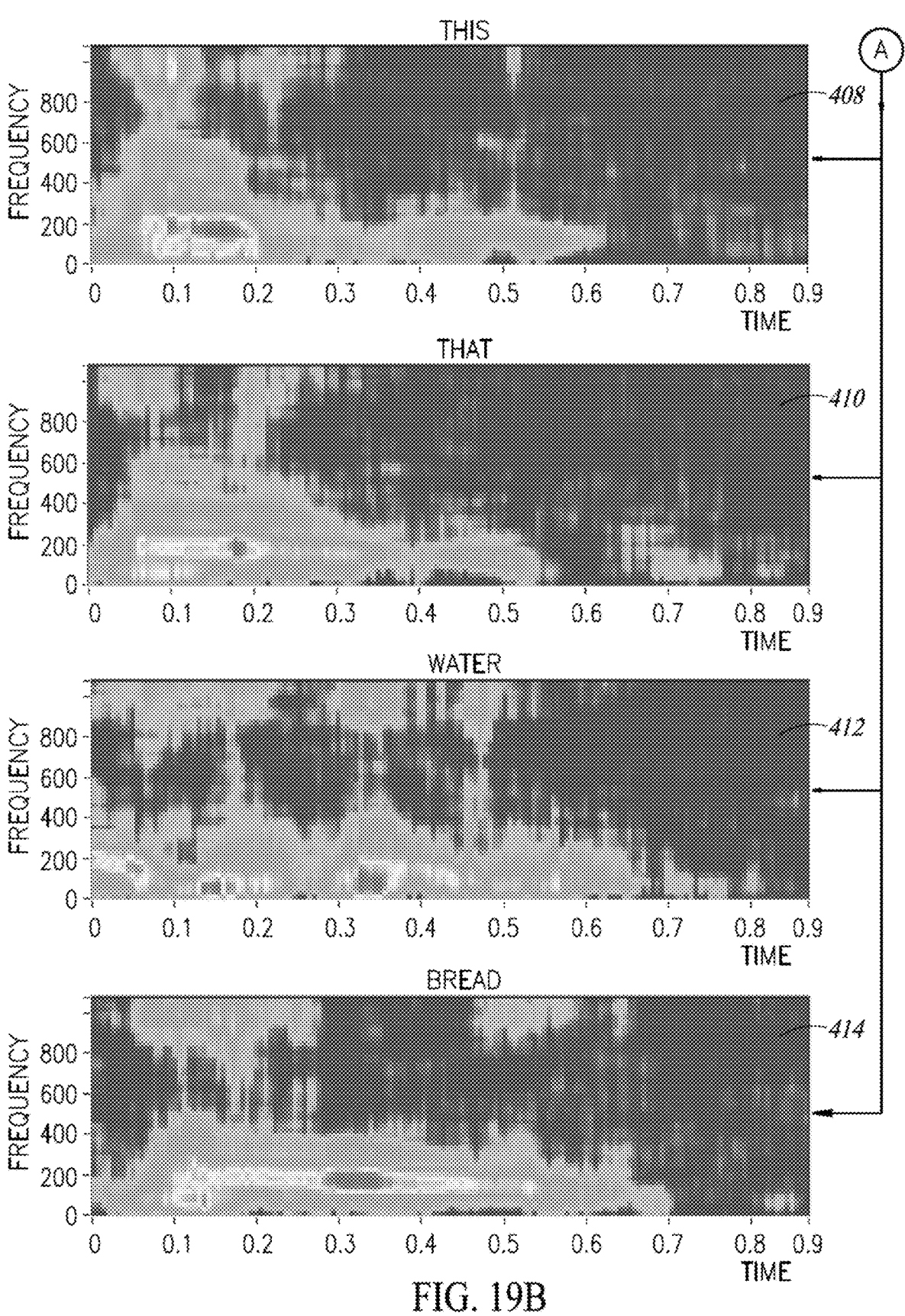

FIGS. 19A and 19B illustrate sentence structure building using accelerometers for bone conduction sensing using the steps set forth in FIG. 21 and the convolution neural network as described with respect to FIGS. 18A and 18B. As shown in FIGS. 19A and 19B, a person who has difficulty forming audible sounds creates a sentence structure in which recognition is carried out by the sensors described herein positioned to sense the bone conduction from the user. At a first part of the conversation, the user speaks a greeting, such as good morning, graph 402 or good evening, graph 404. After this, the user forms a sentence, in the example given speaks the phrase "I would like" graph 406 followed by potential different items which the speaker wants. This might be the item pointed to by the user followed by the phrase "this," 408, "that" as shown by the spectrograph 410, "water", as shown in the spectrograph 412 or "bread" as shown in spectrograph 414.

Figure 20A:
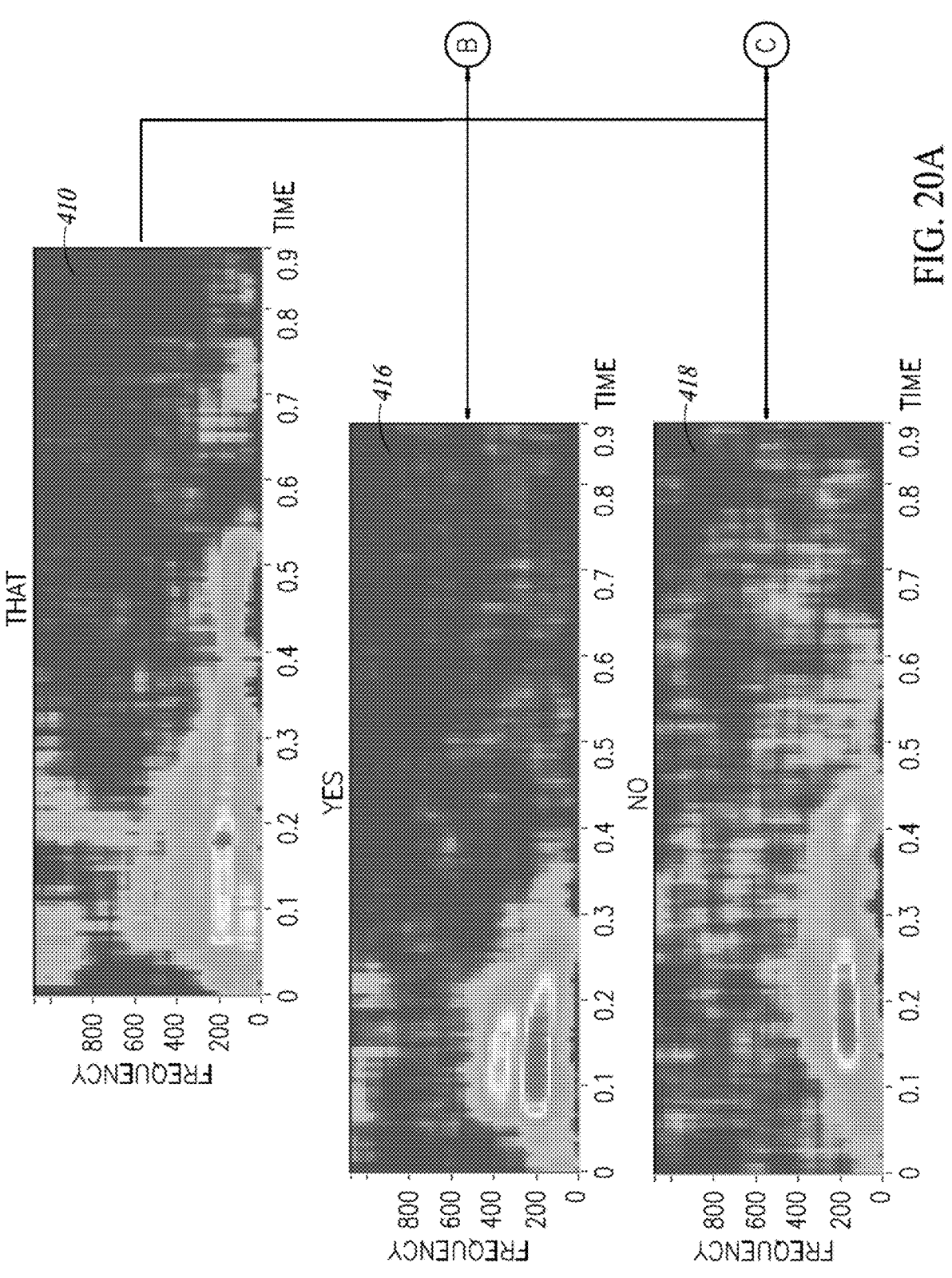
FIGS. 20A and 20B illustrate additional sentence structure building using accelerometers for bone conduction sensing.
Figure 20B:
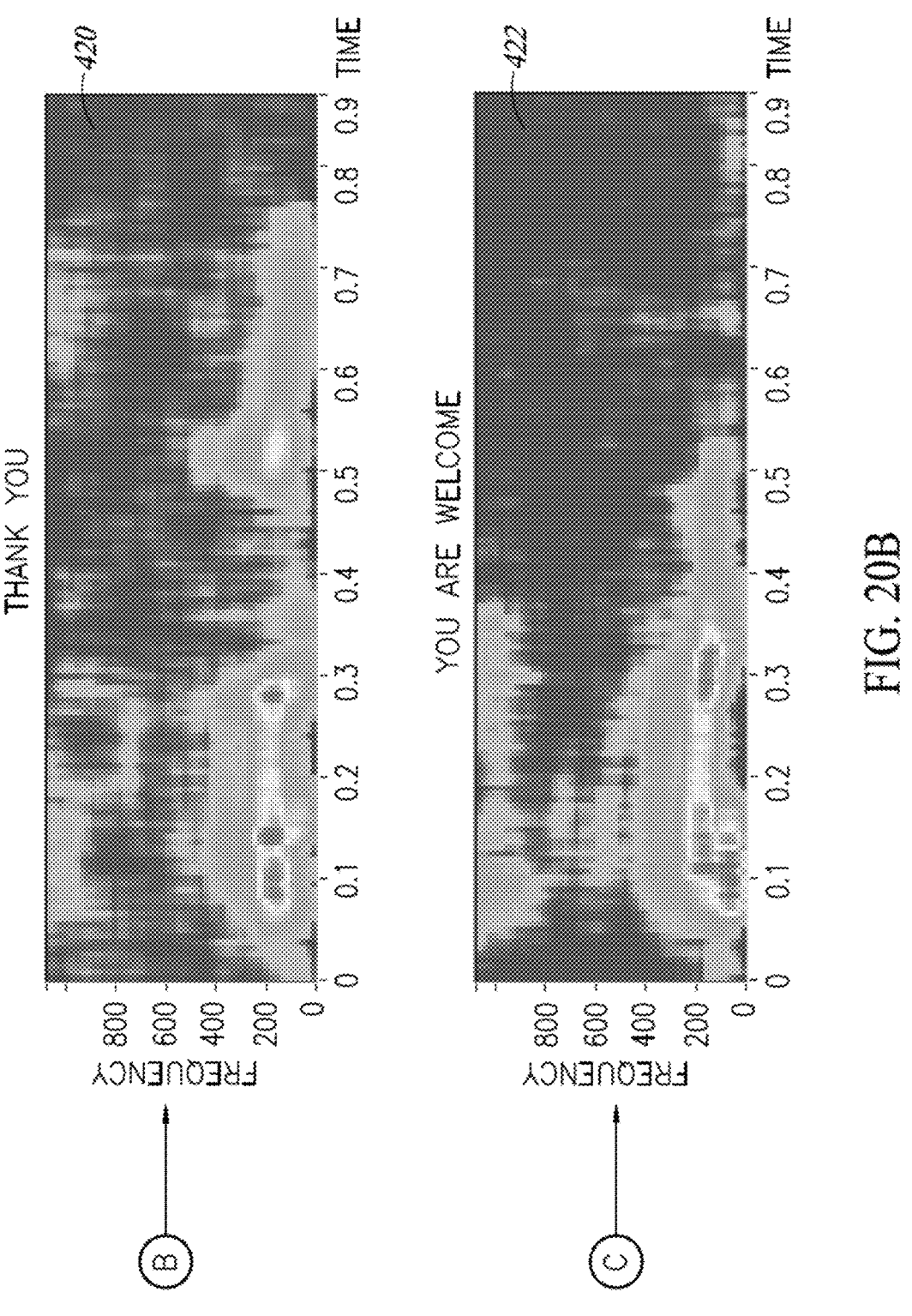

As illustrated in FIGS. 20A and 20B, the speaker can then respond to a word spoken by a different person and after the response can indicate yes, spectrograph 416, or no, spectrograph 418. In the example shown in FIG. 20A, the user has indicated that they wish the item that is shown in spectrograph 410 after which the other person in the conversation confirms the particular item that is wanted. The user can then respond with yes or no as indicated in FIG. 20A. After which, the conversation may progress to the different options of FIG. 20B of stating thank you, spectrograph 420, or you are welcome, spectrograph 422.

The method of sensing the word which has been spoken using accelerometers that sense bone conduction can be carried out on the systems shown with in FIGS. 5 and 6 as previously described herein. In particular, the algorithms which have been described can be part of the AI training in the processor 34 of FIG. 5 or part of the word recognition system of processor 50 in the system of FIG. 6. As indicated in FIGS. 5 and 6, the system begins operation upon sensing the motion in the bone of the user as the accelerometer receives a signal due to the user speaking words.

The present disclosure performs speech recognition based on bone conduction which has an immunity to acoustical environmental noise. In particular, in systems that rely on audio statements by the user, if there are loud adjacent noises, whether from a road, machinery, fans or other loud audio noises, recognition of the spoken word can be very difficult, and in some instances, impossible. However, with the accelerometer closely adjacent to the bone of the speaker there is immunity to the acoustic environmental noise. The local noise does not enter the bone of the speaker and the sole source of the signal is based on vibrations of the bone as the user speaks the words. Accordingly, there is little to no noise from the local environment. Voice commands can be recognized and natural language recognition can be carried out based on bone conduction signals after the signals are processed using machine learning as shown described herein, particularly with respect to FIG. 21. Individuals with impaired speech, problems with motor skills and other issues can have their words and phrases fully recognized using the system as presently disclosed herein.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A voice recognition system, comprising:
a housing;
a speaker within the housing;

a MEMS accelerometer within the housing and positioned to sense vibrations from a user's bone, the MEMS accelerometer configured to:
sense a plurality of reference vibrations conducted from a plurality of different bones of the user's body, the plurality of reference vibrations being sensed in response to the user speaking a plurality of different selected words, respectively, the plurality of different selected words being spoken while the housing is positioned at a plurality of different locations, respectively, on the user's body;
generate reference data based on the sensed plurality of reference vibrations and location data indicating the plurality of different locations;
sense sample vibrations conducted from the user's bone; and
generate sample data based on the sensed sampled vibrations; and
a processor within the housing and coupled to the MEMS accelerometer, the processor configured to:
store the reference data in correspondence with the plurality of different selected words and the location data;
train a classification model using the reference data, the plurality of different selected words, and the location data, including:
performing signal convolution on the vibrations conducted from the bone of the user;
modifying the output of the signal convolution with a non-linearity function; and
performing a scale bias and normalization on the modified signal from the non-linearity function;
receive the sample data generated by the accelerometer while the user wears the housing after the classification model has been trained;
pooling the sample signal on which scale bias and normalization were performed;
performing a second signal convolution on the vibrations conducted from the bone of the user after the pooling step;
modifying the output of the second signal convolution with a second non-linearity function;
performing a second scale bias and normalization on the modified signal from the non-linearity function
pooling the output of the second scale bias and normalization step;
applying a dense function to the twice pooled signal; and
performing a third non-linearity function to the bone conduction data after the dense function;
determine, using the classification model, the sample data matches a word of the plurality of different selected words based on the reference data and the location data; and
cause the speaker to audibly output the word in response to the sample data being determined to match the word of the plurality of different selected words.

2. The voice recognition system of claim 1 wherein the plurality of different locations includes a neck of the user.

3. The voice recognition system of claim 2 wherein the plurality of different bones includes a hyoid bone.

4. The voice recognition system of claim 1 wherein the plurality of different bones includes a chin bone.

5. The voice recognition system of claim 1 wherein the plurality of different bones includes a palatine bone.

6. A method of word recognition spoken by a user, comprising:

sensing, using an accelerometer in a housing, a plurality of reference audio vibrations that are conducted from a plurality of different bones of the user's body, the plurality of reference audio vibrations being sensed in response to the user speaking a plurality of different selected words, respectively, the plurality of different selected words being spoken while the housing is positioned at a plurality of different locations, respectively, on the user's body;

outputting, from the accelerometer and to a processor, reference data based on the sensed plurality of reference audio vibrations and location data indicating the plurality of different locations;

storing, by the processor, the reference data in correspondence with the plurality of different selected words and the location data;

training, by the processor, a classification model using the reference data, the plurality of different selected words, and the location data, the training including:

performing signal convolution on the reference audio vibrations conducted from the bone of the user;

modifying the output of the signal convolution with a non-linearity function; and performing a scale bias and normalization on the modified signal from the non-linearity function;

sensing, using the accelerometer, sample audio vibrations that are conducted from a bone of the user while the user wears the housing after training the classification model;

outputting, from the accelerometer to the processor, a sample signal corresponding to the sensed sample audio vibrations;

pooling the sample signal on which scale bias and normalization were performed;

performing a second signal convolution on the vibrations conducted from the bone of the user after the pooling step;

modifying the output of the second signal convolution with a second non-linearity function;

performing a second scale bias and normalization on the modified signal from the non-linearity function pooling the output of the second scale bias and normalization step;

applying a dense function to the twice pooled signal; and performing a third non-linearity function to the bone conduction data after the dense function;

calculating a label value using the sample signal as input against the classification model;

determining the sample signal is a match to a word of the plurality of different selected stored words based on the location data and if the label value is within a threshold value; and audibly outputting, from the speaker included in the housing, the word of the plurality of different selected words if the sample signal is within the threshold value.

7. The method of word recognition of claim 6 wherein the accelerometer and processor are on the same semiconductor substrate.

8. The method of word recognition of claim 6 wherein the accelerometer and processor are in the housing.

9. A method of performing word recognition spoken by a user, comprising:

sensing a reference set of vibrations conducted from a bone of the user using an accelerometer in a housing, the reference set of vibrations being sensed in response to the user speaking a selected word, the selected word being spoken while the housing is positioned at a location on the user's body, wherein a speaker is positioned in the housing;

outputting, from the accelerometer to a processor, a reference signal based on the sensed reference set of vibrations and a location signal indicating the location on the user's body;

storing the reference signal and the location signal in a memory;

receiving an input providing an identity of a word that corresponds to the reference signal and the location signal;

storing the word as a match to the reference signal and the location signal in the memory;

repeating the prior steps of sensing, outputting, storing, receiving and storing for a plurality of reference sets to store a plurality of different words, the plurality of reference sets being sensed in response to the user speaking a plurality of different selected words, respectively, the plurality of different selected words being spoken while the housing is positioned at a plurality of different locations, respectively, on the user's body;

training a classification model using the stored plurality of reference sets, including:

performing signal convolution on the vibrations conducted from the bone of the user;

modifying the output of the signal convolution with a non-linearity function; and performing a scale bias and normalization on the modified signal from the non-linearity function;

sensing a sample set of vibrations conducted from a bone of the user while the user wears the housing after the classification model has been trained;

outputting, from the accelerometer to the processor, a sample signal based on the sensed sample set of vibrations;

pooling the sample signal on which scale bias and normalization were performed;

performing a second signal convolution on the vibrations conducted from the bone of the user after the pooling step;

modifying the output of the second signal convolution with a second non-linearity function;

performing a second scale bias and normalization on the modified signal from the non-linearity function pooling the output of the second scale bias and normalization step;

applying a dense function to the twice pooled signal; and performing a third non-linearity function to the bone conduction data after the dense function;

calculating a label value using the sample signal as input against the classification model;

determining the sample signal is a match to a stored word if the label value is within a threshold value; and audibly outputting the stored word from the speaker if the sample signal is a match.

10. The method of performing word recognition spoken by a user of claim 9 wherein the accelerometer measures a plurality of vibrations in each of X, Y and Z dimensions.

11. The method of performing word recognition spoken by a user of claim 9 comprising processing a plurality of measurements from the accelerometer into a stream of data.

12. The method of performing word recognition spoken by a user of claim 11 comprising detecting a plurality of words from the stream of data using a neural model.

13. The method of performing word recognition spoken by a user of claim 9 further including:

receiving a first stream of data and training a neural model using the stream of data; and detecting a plurality of words from a second stream of data using the neural model.

14. A device, comprising:

a housing;

an accelerometer in the housing;

a speaker in the housing;

a power supply in the housing coupled to the accelerometer; and a processor in the housing coupled to the accelerometer, the processor configured to:

store a plurality of sets of collected accelerometer signals of the accelerometer and a plurality of locations of the accelerometer on a user's body, the plurality of sets of collected accelerometer signals being sensed in response to the user speaking a plurality of different selected words, respectively, the plurality of different selected words being spoken while the accelerometer is positioned at the plurality of different locations, respectively, on the user's body;

train a classification model using the reference data, the plurality of different selected words, and the location data, including:

performing signal convolution on vibrations conducted from a bone of the user;

modifying the output of the signal convolution with a non-linearity function; and performing a scale bias and normalization on the modified signal from the non-linearity function;

receive sample data generated by the accelerometer while the user wears the housing after the classification model has been trained;

pooling the sample signal on which scale bias and normalization were performed;

performing a second signal convolution on the vibrations conducted from the bone of the user after the pooling step;

modifying the output of the second signal convolution with a second non-linearity function;

performing a second scale bias and normalization on the modified signal from the non-linearity function pooling the output of the second scale bias and normalization step;

applying a dense function to the twice pooled signal; and performing a third non-linearity function to the bone conduction data after the dense function;

determine a spoken word with the function and the plurality of locations of the accelerometer on the user's body in response to a second collected accelerometer signal; and cause the speaker to audibly output the word in response to the sample data being determined to match the word of the plurality of different selected words.

15. The device of claim 14, wherein the housing includes the speaker at a first end, the first end having a bulbous shape, and an extension from the speaker, the first end configured to be received in a user's ear.

16. The device of claim 15, wherein the housing includes a central body with a first extension and a second extension, the central body configured to rest on a back of a user's neck and the first and second extensions being configured to extend toward a front of the user's neck.

\* \* \* \* \*